(12) United States Patent
Walch

(10) Patent No.: US 7,362,901 B2
(45) Date of Patent: Apr. 22, 2008

(54) SYSTEMS AND METHODS FOR BIOMETRIC IDENTIFICATION USING HANDWRITING RECOGNITION

(75) Inventor: Mark Walch, Lake Ridge, VA (US)

(73) Assignee: Gannon Technology Holdings LLC, Alexandria, VA (US)

( * ) Notice: Subject to any disclaimer, the term of this patent is extended or adjusted under 35 U.S.C. 154(b) by 187 days.

(21) Appl. No.: 10/936,451

(22) Filed: Sep. 7, 2004

(65) Prior Publication Data
US 2005/0163377 A1   Jul. 28, 2005

Related U.S. Application Data

(60) Provisional application No. 60/500,498, filed on Sep. 5, 2003.

(51) Int. Cl.
*G06K 9/48* (2006.01)

(52) U.S. Cl. .................. 382/199; 382/186; 382/187; 382/209

(58) Field of Classification Search ............... 382/112, 382/113, 137, 186, 187, 115, 116, 119, 118, 382/188, 209, 219, 284
See application file for complete search history.

(56) References Cited

U.S. PATENT DOCUMENTS

| | | | | |
|---|---|---|---|---|
| 4,961,231 A | * | 10/1990 | Nakayama et al. | 382/197 |
| 5,392,363 A | * | 2/1995 | Fujisaki et al. | 382/187 |
| 5,459,809 A | * | 10/1995 | Kim et al. | 382/160 |
| 5,559,895 A | | 9/1996 | Lee et al. | |
| 5,854,853 A | * | 12/1998 | Wang | 382/176 |
| 5,854,855 A | * | 12/1998 | Errico et al. | 382/187 |
| 5,878,164 A | * | 3/1999 | Brown et al. | 382/190 |
| 5,903,668 A | * | 5/1999 | Beernink | 382/187 |
| 5,923,739 A | | 7/1999 | Disalvo | |
| 5,930,380 A | | 7/1999 | Kashi et al. | |
| 6,011,537 A | * | 1/2000 | Slotznick | 715/733 |
| 6,044,165 A | * | 3/2000 | Perona et al. | 382/103 |
| 6,052,481 A | * | 4/2000 | Grajski et al. | 382/187 |
| 6,108,444 A | * | 8/2000 | Syeda-Mahmood | 382/186 |
| 6,249,604 B1 | * | 6/2001 | Huttenlocher et al. | 382/174 |
| 6,445,820 B1 | | 9/2002 | Love | |
| 6,633,671 B2 | * | 10/2003 | Munich et al. | 382/187 |
| 7,003,158 B1 | * | 2/2006 | Bennett et al. | 382/187 |

OTHER PUBLICATIONS

Dehghan, M. "Signature Verification using Vhape Vescriptors and multiple Neural Networks" IEEE TENCON 96, Dec. 2, 1997, vol. 1, pp. 415-418.

* cited by examiner

*Primary Examiner*—Yosef Kassa
(74) *Attorney, Agent, or Firm*—Baker & McKenzie LLP

(57) ABSTRACT

A biometric handwriting identification system converts characters and a writing sample into mathematical graphs. The graphs comprise enough information to capture the features of handwriting that are unique to each individual. Optical character recognition (OCR) techniques can then be used to identify these features in the handwriting sample so that drafts from two different samples can be aligned to compare to determine if the features in the writing sample correlate with each other.

86 Claims, 32 Drawing Sheets

| 252 | 255 | 258 |
|---|---|---|
| 261 | 265 | 267 |
| 270 | 272 | 275 |

| 300 | 302 | 305 |
|---|---|---|
| 308 | 310 | 312 |
| 315 | 318 | 320 |

| 350 | 352 | 355 |
|---|---|---|
| 357 | 360 | 362 |
| 365 | 367 | 370 |

780

```
<Document id=???>
    <Word id=????>
        <Character id=?, isomorphic=???, position =???>
            <Stroke 1, Lead="NO", End="NO">
                <Skeleton>
                    <point 1 x=???, y=???>
                    <\point>
                <\Skeleton>
                <Contour 1>
                    <point 1 x=???, y=???>
                    <\point>
                <\Contour 1>
                <Contour 2>
                    <point 1 x=???, y=???>
                    <\point>
                <\Contour 2>
            <\Stroke 1>
        <\Character>
    <\Word>
<\Document>
```

AaBbCcDcEeFfGgHhIiJjKkLlMmNn
OoPpQqRrSsTtUuVvWwXwYyZz

SYSTEMS AND METHODS FOR BIOMETRIC IDENTIFICATION USING HANDWRITING RECOGNITION

RELATED APPLICATIONS INFORMATION

This application claims priority under 35 U.S.C. §119 to U.S. Provisional Patent Application Ser. No. 60/500,498 entitled, "System and Methods for Biometric Identification Using Handwriting Recognition," filed on Sep. 5, 2003, which is incorporated herein by reference in its entirety as if set forth in full. This application is also related to U.S. patent application Ser. No. 10/791,375, entitled "System and Methods for Source Language Pattern Matching," filed Mar. 1, 2004, and to U.S. patent application Ser. No. 10/896,642 entitled "System and Methods for Assessing Disorders Affecting Fine Motor Skills Using Handwriting Recognition," filed Jul. 21, 2004, both of which are also incorporated herein by reference in the entirety as if set forth in full.

BACKGROUND OF THE INVENTION

1. Field of the Invention

The field of the invention relates generally to methods of identification and more particularly to identification using handwriting analysis.

2. Background Information

Biometrics is the statistical study of biological phenomenon. Biometrics can be used to automatically identify a person based on physiological or behavioral characteristics. Various biometrics used to identify an individual can include: finger prints, voice print o rpatem, retinal image, DNA, etc. There are many potential uses for biometrics. For example, biometric identification can be used to take the place of a personal identification number (PIN) for use with automated teller machines. Biometrics can also be used to help identify a person who is not physically present. For example, finger prints are commonly used to identify individuals involved in crime. Such an individual is typically not present when his or her finger prints are collected from an item or items at a crime scene.

Biometric identification can also be used to fight different types of fraud One type of fraud is check fraud. More than 500 million checks are forged annually. Check fraud and counterfeiting are among the fastest-growing problems affecting the nation's financial system, producing estimated annual losses of $10 billion. It is estimated that losses from check fraud will grow by 2.5% annually in the coming years. While fingerprints may in some cases be used to identify a person or persons involved in check fraud, in many cases a fraudulent check will not have any finger prints that can be used for identification. Thus, conventional biometric identification techniques are not necessarily easily adaptable to fraud detection.

Biometric handwriting identification can be useful for identification in cases of check fraud, exam cheating, and other cases when handwriting samples are available. Biometric handwriting identification, however, can be time consuming when performed by a person. Additionally, biometric handwriting identification using current automated methods are typically limited.

SUMMARY OF THE INVENTION

A biometric handwriting identification system converts characters and a writing sample into mathematical graphs. The graphs comprise enough information to capture the features of handwriting that are unique to each individual. Optical character recognition (OCR) techniques can then be used to identify these features in the handwriting sample so that drafts from two different samples can be aligned to compare to determine if the features in the writing sample correlate with each other.

In one aspect, OCR techniques can be used not only to identify the occurrence of individual characters, but also the occurrence of groups of characters or parts of characters in two different handwriting samples. The items identified using OCR can be referred to as feature caddies that carry comparable feature information, i.e., the information that is unique to an individual author, from different samples. Thus, the biometric handwriting identification system can use one or more character reference sets to enable individual characters to be identified using OCR.

These and other features, aspects, and embodiments of the inventions are described below in the section entitled "Detailed Description."

BRIEF DESCRIPTION OF THE DRAWINGS

Preferred embodiments of the present inventions taught herein, are illustrated by way of example, and not by way of limitation, in the figures of the accompanying drawings, in which:

FIG. 7 is a diagram illustrating an example of an XML object descriptor that can be used by the system of FIG. 5;

FIG. 8 is a diagram illustrating an example of a school copy set that can be converted to graphs and used by the system of FIG. 5;

FIG. 9 is a diagram illustrating an example a of hand printed writing copy reference set that can be converted to graphs and used by the system of FIG. 5;

FIG. 54 is a diagram illustrating an example of distance between words;

FIG. 55 is a diagram illustrating examples of word proportion bounding boxes;

DETAILED DESCRIPTION

Figure 1A:
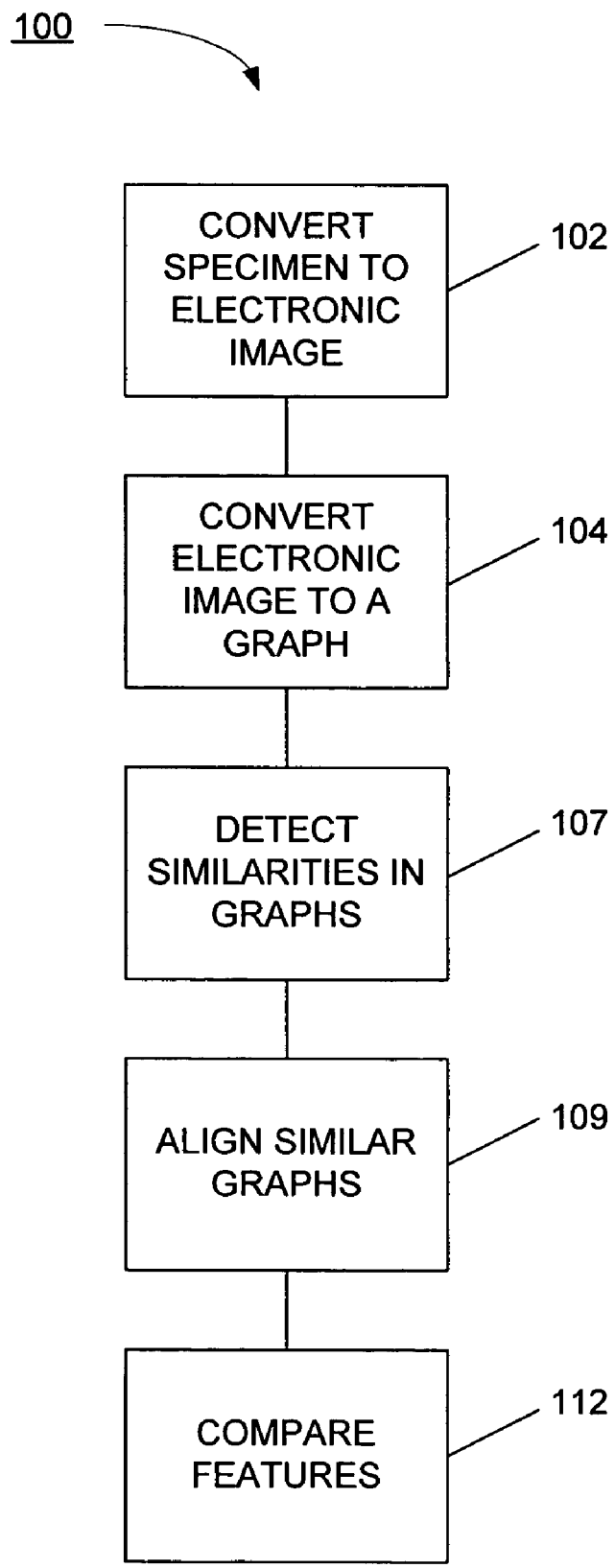
FIG. 1A is a flow diagram illustrating a method of biometric handwriting recognition in accordance with one embodiment.

In one embodiment of the systems and methods described herein, and described in more detail below, groups of words, individual words, characters, parts of characters, or some combination of groups of words, individual words, characters, parts of characters comprising the handwriting in a particular document can be converted into graphs using graph theory. The graphs comprise unique topology and geometry that can be used to identify handwriting characteristics that are unique to the author of the document. The graphs, therefore, provide a platform by which handwriting samples can be compared and analyzed. This is because the graphs can be used as a common denominator that can be used to identify related handwriting samples. Differences between the handwriting samples can be detected as differences between the graphs.

Optical character recognition (OCR) technology can then be used to isolate similar graphs in different writing samples. Further, OCR technology can be used to register, or align similar graphs once they are detected so that corresponding features can be compared directly. As a result, words, characters, and/or parts of characters occurring in different documents can be isolated and compared.

Thus, the graphs become feature caddies carrying feature information from writing samples in such a way that meaningful comparisons between the writing samples can be made. Further, using OCR techniques corresponding points between the graphs are registered on a one-to-one basis. As a result, features from one graph, such as the depth of a curve or a line width, can be matched directly with the same feature from another graph. Feature caddies often represent individual characters, but they can also represent groups of characters or even parts of characters. The features caddies can be used to locate and match the same character, group of characters, or parts of characters from a plurality of different writing samples. Thus, feature caddies can be used to identify the author of a particular writing sample.

In one embodiment, a feature manager, described in more detail below, can be configured to maintain graphs of handwriting specimens and to allow searches, or queries to be performed on the graphs. Thus, when a new handwriting specimen is received it can be converted into a digital image. The feature manager can be configured to then extract features from the digital image and store them, for example, in a data base. The feature manager can then be further configured to allow queries to made for caddies of similar features from the same writer or from different writers. Identifying information, e.g., metadata, can also be associated with the extracted features such that the author can, for example, be linked with the features and the writing sample. While the identifying information can be used to associate the writing features with the author, it does not necessarily identify the author.

Thus, in one example embodiment, handwriting samples can be examined on an individual character basis. Next, each character can be broken down into representative graph data. Next, features can be extracted from the graph data and collected in feature caddies. An author can be associated with each caddie. Then, these caddies can be queried for matching information. As an example, a subject can have several documents already processed by the system, whereby features associated with the subject reside in one or more feature caddies. A handwriting sample can then be submitted for identification purposes. The sample can be segmented into characters and each character can be broken down into representative graph data from which features can be extracted. Feature caddies can then be queried and used to determine if the handwriting is a match.

The handwriting "match" can be a statistical match between all or some of the features in the submitted sample with a feature caddie, or caddies, in the system. For instance, the degree of morphing of the subject's "A" with respect to reference characters is similar to those in a feature caddie for the letter "A" and the slant angles of the various characters in a writing sample are approximately the same as those found in the feature caddie for those characters corresponding to the same subject. It can be concluded that if enough features match those in feature caddies, that the author of the data in the feature caddies is a match to that of the handwriting samples.

In order to generate feature caddies, individual characters must be identified. Conventional OCR techniques can be employed here. Typically, a document is segmented first into words and then with the start and of each word identified, individual characters can be identified. The individual characters can then be broken down into graph data that can emphasize a label identifying which character of the alphabet the character represents, the skeleton of the character, which is a vector representations of the centerlines of all the character keystrokes, the contours of the character which is a collection of all points along the perimeter of the each stroke, and an edit log, which is a record of minor edits needed to enable meaningful values of the above data, e.g., the removal of a small gap in a stroke.

The features collected in feature caddies are typically metrics measuring the deviation from known standards. In one embodiment, a school copy reference set, which dictates how characters are properly written can be used as such a standard; however, due to upbringing, individuality, and other factors, individuals often write alternate forms of a character or allographs. Therefore, in addition to the school copy reference set, a writing copy reference set can also be used as required by a particular embodiment.

The writing copy reference set can, for example, be a collection of allographs of each character in the alphabet derived from handwritten samples. These samples can include both hand printed and hand scripted writing styles. Often, a given character sample can more effectively be associated with a character of the alphabet by first associating the character with a character in, i.e., the writing copy reference set and then deriving an associated school copy reference set character from the character in the writing copy reference set.

Features in the caddies can comprise the character-level features and subcharacter-level features. For example, the discussion below discloses 41 different character-level features and 12 different subcharacter-level features and non-caddie based features. The character-level features can include topological features, such as allograph classes, vertex and edge related topological features, and contour information, to name just a few. Additionally, the character-level features can include geometric and proportion features such as size, proportion, and slant of characters. There are also many stylistic and stroke related features, such as stroke components, consistency of character connections, direction and fluctuations of features, punctuation, pen pressure, stroke sequences and retracing to name just a few.

Subcharacter-level features can focus on geometric objects that do not necessarily constitute characters themselves, but comprise characters. These subcharacter level features can include, for example, garlands, loops, cusps, crossings, T-intersections, and termination points. The subcharacter-level features often pertain to attributes of these objects, such as termination tapers, loop attributes.

Further, in certain embodiments there can be features that are not part of the caddie model. These include features at the word level such as word proportions and spacing, and the manner in which characters are connected together through subcharacter-level objects such as garlands and cusps.

Additional details of the process and the technology are described further with respect to the Figures below. However, while certain embodiments of the inventions have been described above and in more detail in with respect to the Figures discussed below, it will be understood that the embodiments described are by way of example only. Accordingly, the inventions should not be limited based on the described embodiments.

FIG. 1A is a flow diagram illustrating a method of biometric handwriting recognition in accordance with one embodiment of the system and methods described herein. In step 102, a handwriting specimen is converted into an electronic image. Typically, these electronic images are bi-tonal. Generally the two tones in the bi-tonal image are black and white and every pixel has a value of either black or white.

The electronic image can then be converted into a mathematical graph in step 104. In an embodiment the mathematical graph is created by converting all line forms in the electronic image into an image skeleton and then transforming the skeleton into the edges and vertices of a graph. Typically in this graph, the edges represent the individual lines from the original image and the edges represent the "center line" from each line in the original image. An illustration of the components of an image graph will be discussed with respect to FIG. 2 below.

Graphs provide a solid platform for comparing and analyzing handwriting samples. Since graphs can be generated for any writing sample, they provide a common denominator among samples. Differences between writing samples can be detected as differences between graphs. OCR technology can isolate and detect similar graphs. In the embodiment shown in method 100 of FIG. 1A similarities between a plurality of graphs are detected in step 107.

Similar graphs can then be aligned in step 109. Registering or aligning the graph allows corresponding features to be compared directly. This comparison can occur in step 112. The comparison step 112 can also include a more detailed comparison than any comparison that may occur with respect to the aligning step 109. Words, characters, and parts of characters occurring in different words can be isolated and matched. The matching process entails aligning the graphs so that specific features—edges and vertices—align in such a way that they can be compared.

Some examples of features that can be compared include the apex of the upper case "A", the center horizontal line in the upper case "E", and the loop in the cursive lower case "l". With an OCR-based methodology, the graphs become the "caddies" carrying feature information from writing samples in such a way that meaningful comparisons can be made using automated techniques. Feature alignment will be discussed further with respect to FIG. 4.

In one embodiment step 104, i.e., converting an electronic image into a mathematical graph, can comprise converting all line forms in an image into an image skeleton and transforming the image skeleton edges and vertices of a graph.

Figure 1B:
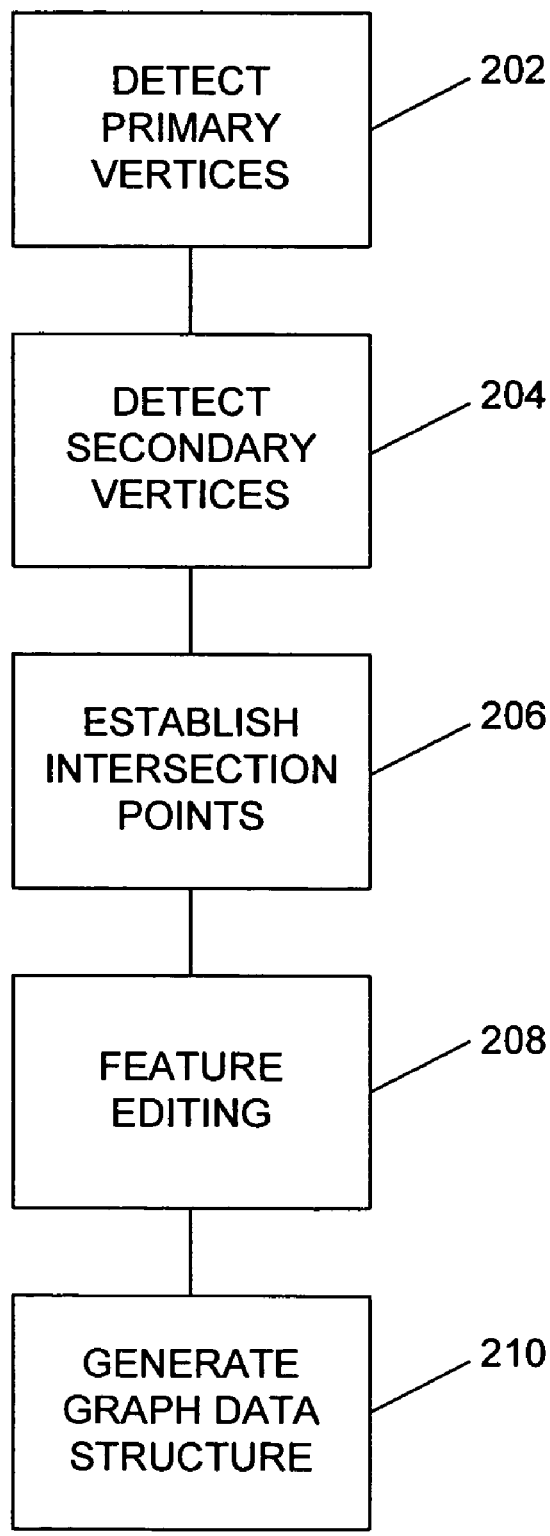
FIG. 1B is a diagram illustrating a more detailed implementation of the graph generation step of FIG. 1B.
Figures 2, 3A, 3B, 3C:
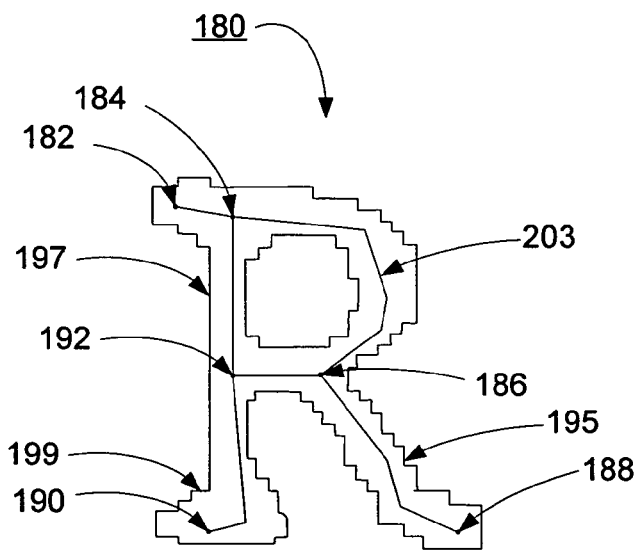
FIG. 2 is a diagram illustrating an electronic image of a character that can be converted into a graph in accordance with the methods of FIG. 1A and 1B.
FIG. 3A is a diagram illustrating a cross intersection vertex that can be included in an electronic image of a character, such as the character of FIG. 2.
FIG. 3B is a diagram illustrating a T-intersection vertex that can be included in an electronic image of a character, such as the character of FIG. 2.
FIG. 3C is a diagram illustrating a termination vertex that can be included in an electronic image of a character, such as the character of FIG. 2.

FIG. 1B is a flow chart illustrating an example method for converting an electronic image into a graph in accordance with the systems and methods described herein. First, however, FIG. 2, is a diagram of a character 180, i.e., an upper case "R", that can be used to help illustrate the above process. The diagram illustrates several sample graph components associated with character 180, including vertices 182, 184, 186, 188, 190, 192. The vertices 182, 184, 186, 188, 190, 192 are examples of primary vertices. Also shown are contours, for example contour 195 and edges 197, 199. The graph captures the overall shape of the character. The principle components of the graphs are: edges, vertices, and contours. The contours represent the external shape of the character represented by the graph and, although not strictly part of the graph, they represent important data from the underlying character.

Thus, the graph components illustrated in FIG. 2 can be obtained and used to form a skeleton 203 in accordance with the process of FIG. 1B. Once skeleton 203 has been obtained, it can be converted into a graph. In one embodiment, graph building begins with obtaining primary vertices in step 202, e.g., vertices 182, 184, 186, 188, 190, 192. After locating at least one primary vertex the next step can be to follow the pixels of the electronic image from one vertex to another. In a skeletal image all primary vertexes fall into three categories, cross intersections, T-intersections, and terminations. Character 180 includes several examples of a termination 182, 188, 190 and an example of a T-intersection, vertex 192. FIG. 2 does not include an example of a cross intersection. An example of a cross intersection would be a lower case "t" where the two main lines of the character cross.

It will be understood that hand writing tends to vary, a trait that makes it useful for identification purposes. It will be further understood that due to the variety of handwriting samples, the examples discussed are only a few of the many examples that are possible.

Each of the types of node, vertex, or can be detected by checking the pixels around a pixel of interest, as illustrated in the example of FIG. 3A-C. FIGS. 3A-C are diagrams illustrating a pixel of interest in the center along with different types of intersections, including cross intersections, T-intersections, and terminations. In the diagrams the center square indicates a pixel of interest. The dark squares indicate surrounding pixels that are part of the image skeleton. The white squares indicate pixels that are not part of the image skeleton.

Thus, FIG. 3A includes a pixel of interest 265. Pixel of interest 265 is surrounded by pixels 252, 255, 258, 261, 267, 270, 272, 275. Pixels 255, 261, 267, 272 and pixel of interest 265 are dark. Dark pixels 255, 261, 267, 272, as described above indicate pixels that are part of the image skeleton. The four pixels that are white 252, 258, 270, 275 indicate pixels that are not part of the image skeleton. Examination of the dark pixels show that pixel of interest 265 and dark pixels 255, 261, 267, 272 form a cross intersection. Similarly, FIG. 3B includes a pixel of interest 310. Pixels 300, 302,305, 315, 320 are white. The pixels 300,302, 305,315, 320 are not part of the image skeleton. Pixels 308, 312, 318 and the pixel of interest 310 are dark and form a T-intersection. FIG. 3C illustrates a termination, wherein pixel 367 and the pixel of interest 360 are dark. Pixel of interest 360 and dark pixel 367 form a portion of the image skeleton. Pixels 350, 352, 355, 357, 362, 365, 370 are white and are not part of the image skeleton.

It will be clear that other types and variations are possible. For example, a cross intersection does not necessarily occur with each line of the character parallel to the edge of the page. A cross intersection can, for example, be a cross intersection associated with the letter "X". It will also be appreciated that other examples are possible since the skeleton is a representation of handwriting, and in many cases handwriting can be considered "sloppy" or "messy". The examples of FIG. 3A-C will likely not, therefore cover every possible intersection due to variation in handwriting. For the cross intersections, T-intersections, and terminations can occur at angles other than the angles indicated in FIGS. 3A-C.

Once the primary vertices have been detected in step 202, the secondary vertices can be detected in step 204. Secondary vertices can be defined as all vertices that connect two—and only two—edges. Secondary vertices are created by the following conditions, corners, zero crossings, and minimal points.

Figures 3D, 4:
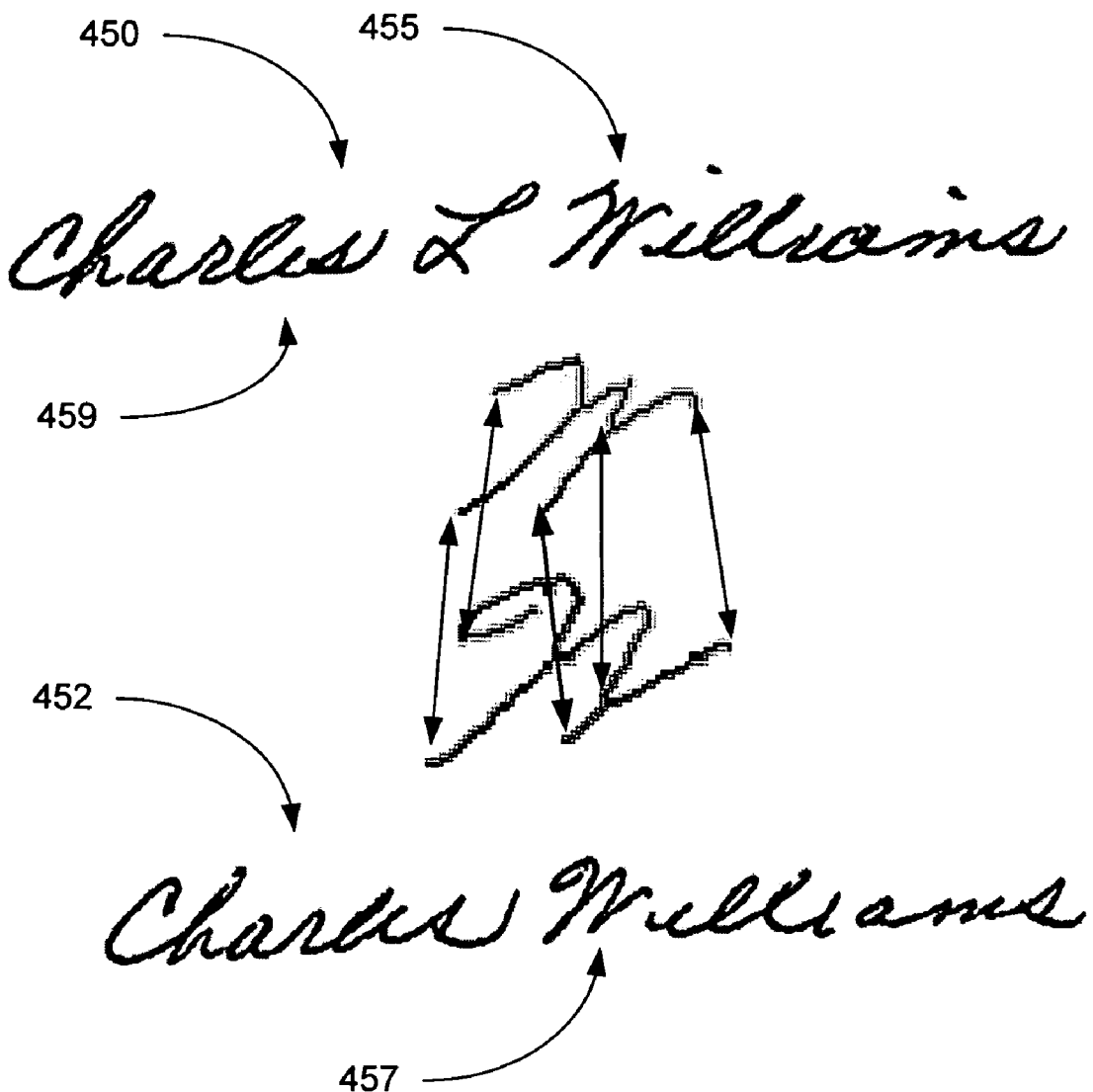
FIG. 3D is a diagram illustrating a secondary, corner vertex that can be included in an electronic image of a character, such as the character of FIG. 2.
FIG. 4 shows an example of a graph registration between two signature specimens in accordance with the methods of FIG. 1A and 1B.

One example of a corner is shown in FIG. 3D. FIG. 3D is a diagram of a graph skeleton intersection condition, similar to FIGS. 3A-C. A pixel of interest 410 is shown. The pixel of interest 410 and pixels 407, 417 are dark and clearly for a corner. As noted above, however, this is only one possible example of a corner. Other examples are possible, e.g., a corner may not meet at right angles, as a result of variations in handwriting.

An example of a zero crossing is the middle of the letter "S". The exact angle of pixels at the zero crossing may vary. The connection between two cursive letters is an example of a minimal point.

In one embodiment, once the primary and secondary vertices have been detected, intersection points are established, in step 206 where the vertex regions intersect the edges. Once these points have been established, the paths between these points can be captured in the same way the paths between vertices were captured. The captured edge paths become the contours for the graph.

Typically, graph building involves minor feature editing, step 208 such as closing of small gaps, the connection of undershoots and the combination of closed vertices. These functions are similar to those routinely applied to any type of line drawing.

In one embodiment a graph data structure is formed in step 210. Elements of a graph data structure can include a graph label, skeleton, contours, and an edit log. The graph label can be a character of the alphabet or other assigned name. The skeleton can be a vector recreation of the centerlines of all character keystrokes. The skeleton can, for example, be the same or similar to the skeleton 203 of FIG. 2. Every skeleton can be linked to two contours. Contours are a collection of all points along the perimeter of the original pen-strokes. One example of a contour is the contour 195 of FIG. 2. Typically, every contour is linked to a skeleton line.

As was discussed above, in FIG. 1A, similar graphs are aligned in step 109. Registering or aligning the graph allows corresponding features to be compared in step 112. The aligning 109 and compare 112 steps will now be discussed further with respect to FIG. 4. FIG. 4 shows an example of a graph registration from two signature specimens, signature 450, "Charles L. Williams" and signature 452, "Charles Williams".

As an example the "W" 455 from signature 450 can be compared to the "W" 457 from signature 452. In this example the text written in each writing sample 450, 452 is similar, signature 452 is missing the middle initial "L" 459. In this specific example the "W" 450 can be compared with the "W" 452. Other types of comparisons are, of course possible. For example the letter "W" from one word, for example "When" in one sample could be compared with the letter "W" from the word "Where" in another sample.

Aligning graphs representing the same character or group of characters provides a useful vehicle for supporting more detailed comparison of similarities or differences in writing. In this manner, the individual characters that are isolated from separated writing samples are compared and become the "feature caddies" that carry the feature data and support the analysis of the features. Features are typically individual characters, but they can also represent groups of characters or parts of characters. Thus, feature caddies can be used to locate and match the same character, group of characters, or parts of characters from a multiplicity of different writing samples. Once the same items are matched, feature caddies can also promote specific registration among samples so that specific keystrokes from one sample can be compared with specific keystrokes from another sample.

The caddie-based feature approach presumes the creation of two sets of reference allographs. The school copy reference set and the writing copy reference set. Typically, the school copy reference set represents idealized forms of characters that are used to train beginning writers. The written copy reference set generally represents actual character models extracted from various documents.

In one embodiment caddie-based feature comparisons are performed between elements within the school copy set and the written copy reference set. Alternatively, in another embodiment, caddie based feature comparisons are performed between two elements within the writing copy reference set. In other embodiments, a combination of the two caddie-based feature comparisons occurs.

Figure 5:
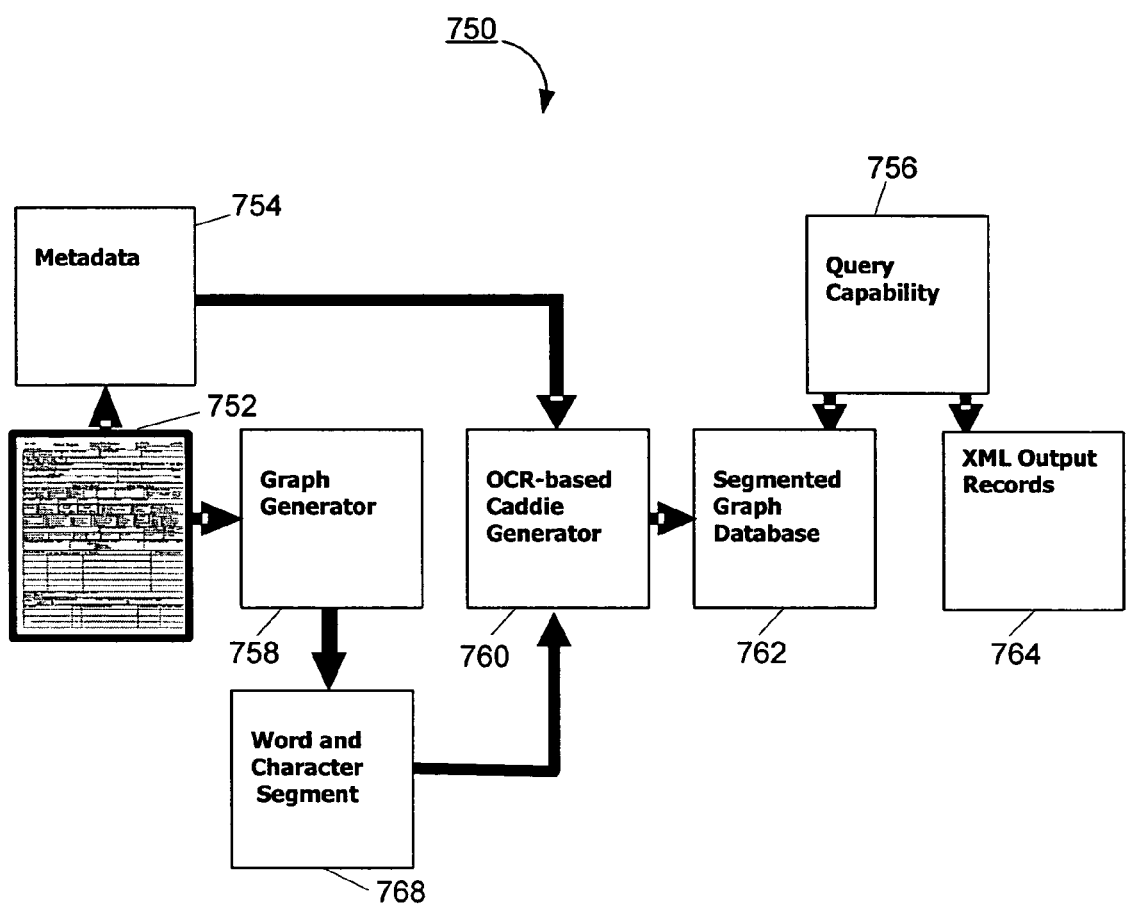
FIG. 5 is a diagram illustrating an example of a feature manager software system in accordance with one embodiment.

The feature caddie concept can be implemented in software through a feature manager 750 as illustrated in FIG. 5.

The purpose of the feature manager 750 is to provide a platform that can query a large volume of caddies and return a set responsive to a particular query. The returned set can then be subjected to further evaluation and analysis.

In one embodiment, feature manager 750 is a software module that maintains graphs of handwriting specimens and permits queries to be performed against these graphs. In the embodiment illustrate in FIG. 5, feature manager 750 comprises a graph generator 758 configured to generate graphs of handwriting samples 752 as described above. Feature manger 750 cam also include a word and character segmentor configured to segment the graphs into features that can be compared as described above. An caddie generator 760 can be included to then generate feature caddies from the segmented graphs and, depending on the embodiment, metadata 754 related to the segmented graphs. The segmented graphs and metadata can then be stored in a segmented graph database 762.

Feature manager 750 can also include a user interface that can allow queries 756 to be constructed and entered. Feature manager 750 can also include one or more output devices, for example, to generate, and output reports based on the queries provided. Thus, feature manager 750 can include the capability and resources to execute the queries 756 and generate the requisite reports 764 or other output.

Further, feature manager 750 can be configured to extract and manage features and permit queries to be made for caddies of similar features from the same writer or from different writers. The caddies are graphs that can represent individual characters, groups of characters or parts of characters. Metadata 754 typically includes a unique anonymous code that links a writing sample 752 to the author without identifying the author.

Individual graphs can be segmented from other graphs at three levels, document segmentation, word segmentation, and character segmentation. Segmentation will be discussed further below with respect to FIG. 6.

Depending on the embodiment queries 756 can be issued against metadata 754 as well levels of segmentation. Additionally, queries can be issued for specific graphs. These graphs can, for example, represent character "atoms" such as loops, cusps, curves and termination points as well as multi-letter combinations. In response to all queries, the feature manager 750 canl return its results in XML format.

As an example, queries 756 can be made for all occurrences of the letter "A" or the character combination "ae" from two writing samples. Feature manager 750 can be configured to then return all instances of graphs matching these queries as well as data regarding the matching edges and vertices that would align these graphs. These results can be returned as XML-tagged data.

Figure 6:
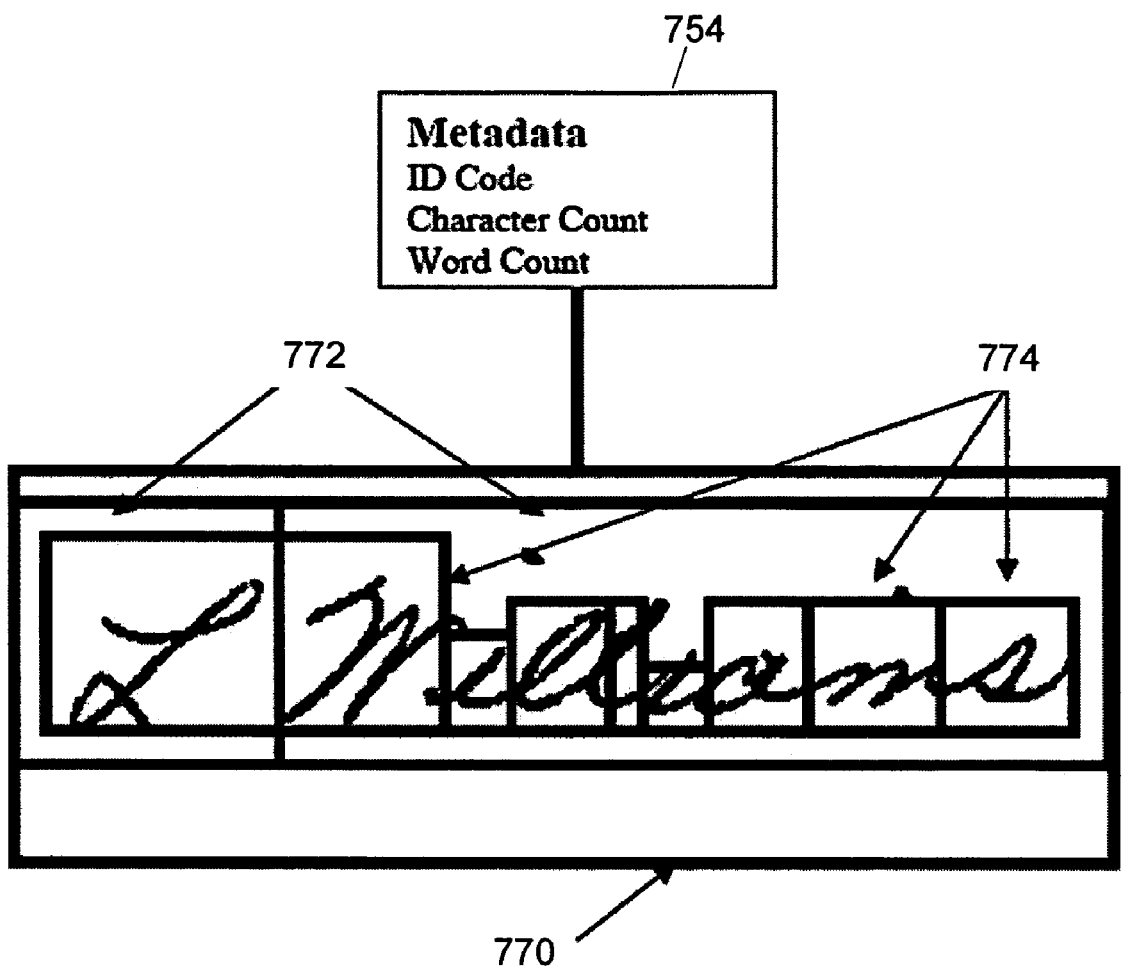
FIG. 6 is a diagram illustrating examples of segmentation and metadata relationships in support of a feature manager.

FIG. 6 is a diagram that illustrates segmentation and metadata structures 754. In one embodiment, metadata 754 can include an author identification code, a number of words on document, and a number of characters on a document. This information can, depending on the embodiment, be supplied, e.g., via the user interface or from the writing samples 752. Within each document, graphs are segmented at the individual word level. That is, all graphs comprising a particular word can be referenced together by a query for that word. The third level is the character segmentation 774. Within each word, individual characters are further segmented for reference purposes.

In one embodiment, character-level data is maintained as character symbols, character position within a word, bounding box coordinates for a character, isomorphism code, direction feature vector, and contour edge identifier. Thus, given the word level data structure outlined with respect to FIG. 6 coupled with the data elements maintained at the character level, specific queries can be performed. The specific queries will be discussed below after a discussion of the data elements maintained at the character level. The character symbol is the grapheme representation for the particular character. Character position in word is a numeric value describing the position of the character. The bounding box coordinates for a character can consist of two coordinate values—the upper left corner and the lower right corner of a box that encapsulates the character. The isomorphism code is a unique code representing character topology as a unique value.

The directional feature vector can consist of six matrices of directional values for the relationships between pairs of graph components: edge-to-edge, edge-to-vertex, edge-to-face, vertex-to-vertex, vertex-to-face, face-to-face. The contour edge identifier is a factor that points to individual edges that connect a character graph to an adjacent character graph.

As discussed above, given the word level data structure outlined with respect to FIG. 6 coupled with the data elements maintained at the character level, specific queries can be performed on words, characters, non-characters, isomorphisms, position of characters within a word, and by stroke. Typically, in a word query, feature manager 750 isolates word level graphs for labeled words and returns the results as and XML file. Queries can also be performed by character. In a character query the feature manager 750 can isolate letters of the alphabet and other defined characters. Similarly non-character graphs, a specially defined graph that is not a specific character, can be isolated by feature manager 750.

The feature manager 750 can also isolate graphs by isomorphism, a unique key generated for each character graph; by position of character in word, and by stroke. Isolating graphs by stroke can include the beginning of a word, the first stroke encountered on the leftmost side of the encapsulated word, the end of a word, or the last stroke encountered on the rightmost side of the encapsulated word. Additionally, isolating graphs can include a character connector or all strokes that cross from one character to another. Depending on the embodiment, combinations of the above queries can be performed.

FIG. 7 is an example of an XML object descriptor in accordance with one embodiment of the systems and methods described herein. As a query is performed, feature manager 750 of FIG. 5 can be configured to comb through all stored information and isolate graphs responsive to the query. These results can then be returned as an XML file. A sample XML file object descriptor 780 is shown in FIG. 7.

The XML results can be returned at the document level, the word level, and can the character level. Within the character level, every stroke can be defined. Strokes carry additional data, e.g., indicating if they are the lead or end strokes in a word. Within the stroke, the skeleton line and two contour lines are described as a series of points. Also, at the character level, an isomorphism code can be provided. Any two records sharing the same code should have identical graph structures and therefore should have identical or substantially similar XML descriptors 780.

FIG. 8 presents a sample of a school copy set 800 that is similar to the character set used to train writers in the United States. It will be clear that other school copy sets are possible. In some embodiments marks or symbols of other writing systems are possible.

FIG. 9 shows some sample allographs that were produced from actual writing samples and illustrate the types of characters that are part of an example writing copy reference set 850. As discussed above, it will be clear that other writing copy sets are possible. In some embodiments marks or symbols of other writing systems are possible.

The premise of the caddie system is that sufficient models will exist in the writing copy reference set to match virtually all new characters that are likely to be encountered. However, many characters encountered in practice will not match the school copy models exactly. In the latter case, it is necessary to provide a feature mapping between items in the written copy reference set and the school copy reference set. In this way, a new model can be matched against its corresponding writing copy model and mapped against the school copy models for those forms of analysis that compare sample writing against school copy.

Figure 10:
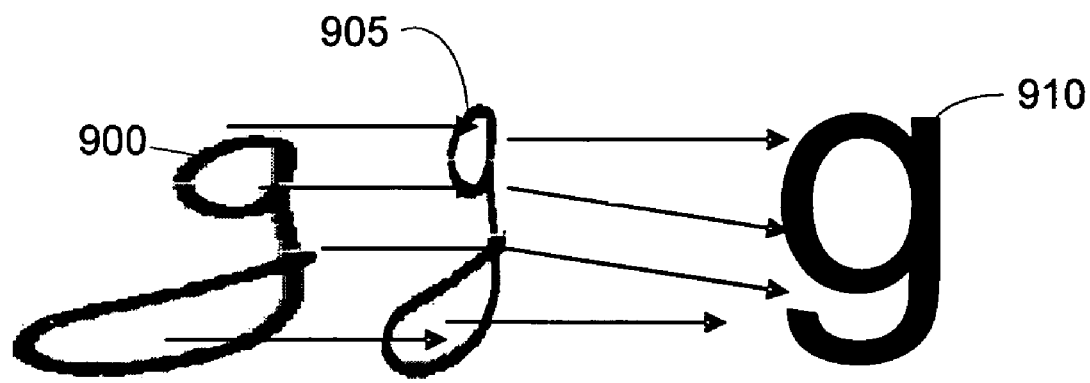
FIG. 10 is a diagram illustrating how a new sample can be mapped to school copy using the system of FIG. 5.

An example of mapping will now be discusses with respect to FIG. 10. FIG. 10 illustrates mapping a new sample 900 to a school copy 910. The figure includes new sample 900 letter "g," a closest writing copy 905 letter "g," and a school copy 910 letter "g". The new sample 900 letter "g" is compared to characters from the writing copy. In some cases a close match may be found. The closest written copy 905 is then typically associated with the new sample 900. The written copy 905 is also typically associated with a school copy 910. The new sample 900 is then mapped to the school copy 910. It will be clear that this is only an example of a possible embodiment. Other embodiments are possible, including other school copy, other writing copy, and other samples.

Typically samples that are being compared will be a plurality of documents, for example, signatures on a signature card and a check, or two other hand written documents. A sample is not, however, limited to a plurality of documents. For example, in some cases it may be necessary to determine if a document was written by one individual. In this example each sample may comprise a group of letters from the same document.

Features generally referred to as character-level caddie-based features will now be discussed with respect to several figures. The term character-level caddie based feature, while generally correct and descriptive is not intended to limit the feature. In some cases the feature may be more broad, for example, FIG. 12 discussed below refers to the letters "th". It will be clear that strictly speaking "th" is not a single character. Additionally, the features discussed are only examples. Many other examples are possible. Allograph and ligature topology classes will be discussed with respect to FIGS. 11 and 12 respectively. An allograph is a variant shape of a letter. A ligature is a character, letter, or type combining two or more letters.

Figure 11:
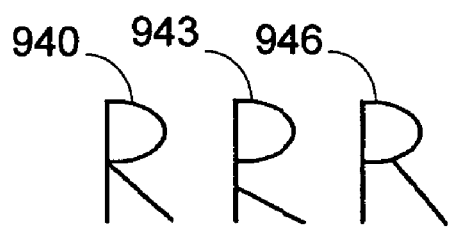
FIG. 11 is a diagram illustrating an example of alternative sample allographs.
Figure 12:
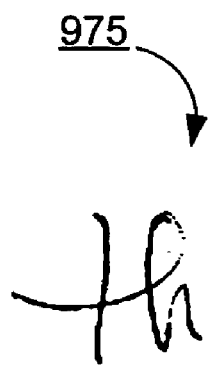
FIG. 12 is a diagram illustrating an example of a ligature.

Referring now to FIG. 11, allographs 940, 943, 946 will be discussed. FIG. 11 shows alternative allographs 940, 943, 946 for the letter "R". Although the three allographs 940, 943, 946 represent the same letter they do not share the same topologies and are not isomorphic. In other words, each "R" does not exhibit a one-to-one correspondence between the elements of either of the other "R's". It will be clear that the allographs 940, 943, 946 are only examples of possible allographs. Other allographs are possible. There are typically four classes of allographs, cursive writing, manuscript writing, hand print, and composites of the first three types. FIG. 12 shows a ligature for the characters "th". As discussed above, a ligature is a character, letter, or type combining two or more letters. In this case the ligature is a "th".

Thus, the allograph for a pair of individual characters can be compared as can the ligatures for a plurality of characters.

Allograph minimum morphing is an example of another caddie-based feature that may be used for biometric handwriting identification. This feature establishes a "morphing distance" value for any two individual edges or any isomorphic combination of edges from two graphs—including graphs representing entire characters or groups of characters. The curves are normalized for length and are fitted for shape. The actual shape measurement is based on an open polygon fitted to the curve. Allograph minimum morphing will now be discussed with respect to FIGS. 13, 14, and 15.

Figure 13:
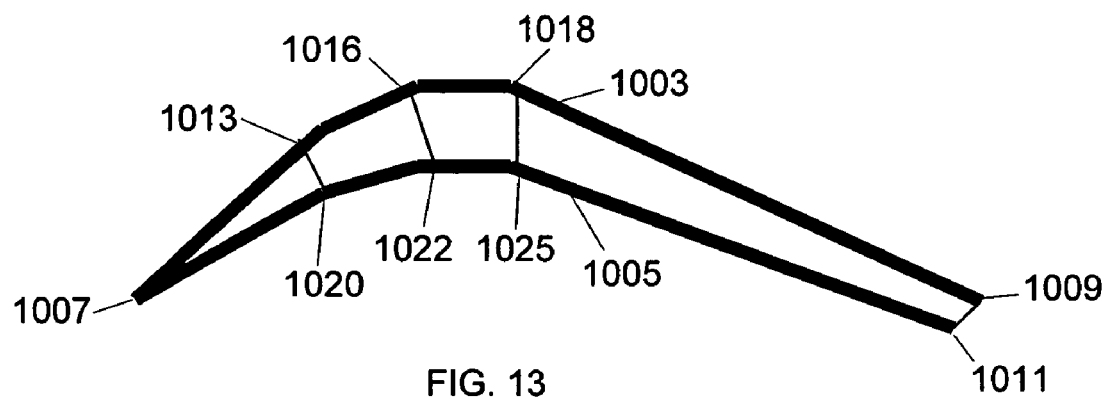
FIG. 13 is a diagram illustrating an example of allograph edge curve fitting.

Referring now to FIG. 13 a diagram illustrating a sample allograph edge curve fitting will be discussed. This feature establishes a "morphing distance" value for any two individual edges or any isomorphic combination of edges from two graphs—including graphs representing entire characters or groups of characters. In one embodiment the curves are normalized for length and are fitted for shape. The actual shape measurement is based on an open polygon fitted to the curve.

FIG. 13 illustrates the concept of Allograph Minimum Morphing for two curves 1003, 1005. The two curves 1003, 1005 are aligned both by their end points 1007, 1009, 1011 and contour points 1013, 1016, 1018, 1020, 1022, 1025. Once these alignments are made, the distance between the respective curves can be calculated. For example, the distance between the two end points 1009, 1011 can be calculated. Additionally, distances between counter points 1013, 1020; counter points 1016, 1022; and counter points 1018, 1025 can also be calculated. Note that the two curves 1003, 1005 share a common end point 1007, so that the distance in this example, for the end point 1007 is zero.

Figure 14:
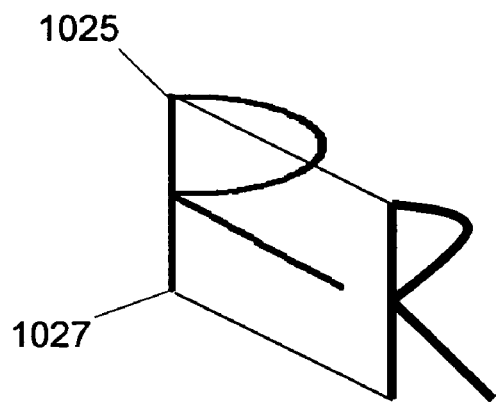
FIG. 14 is a diagram illustrating an example of initial alignment points.
Figure 15:
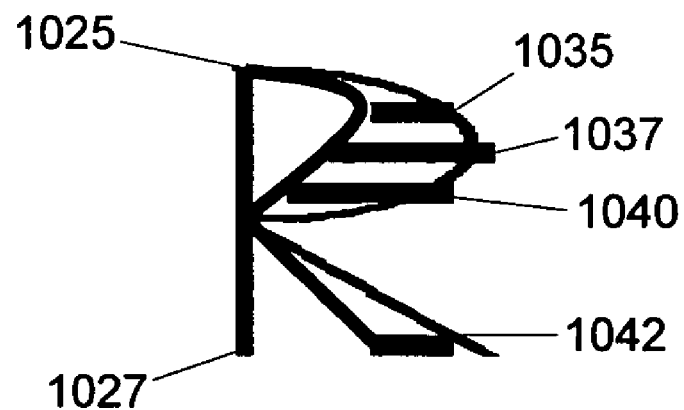
FIG. 15 is a diagram illustrating an example of morphing distance.

In the case of more complex graphs, exact alignment can be made on two points. FIG. 14 shows an example of two alignment points 1025, 1027. Once the initial alignment has been accomplished, the graphs are registered at these points 1025, 1027 and the Morphing distance between them is established. In this example the two alignment points 1025, 1027 are the top left and bottom left corner of each letter "R" FIG. 15 further illustrates the concept of Morphing distance. In FIG. 15 each letter "R" is aligned on the alignment points 1025, 1027. The alignment points 1025, 1027 are the same or similar to the alignment points 1025, 1027 of FIG. 14. "Morphing distance" between each of the aligned letters can then be measured as illustrated by the horizontal lines 1035, 1037, 1040, 1042.

Figure 16:
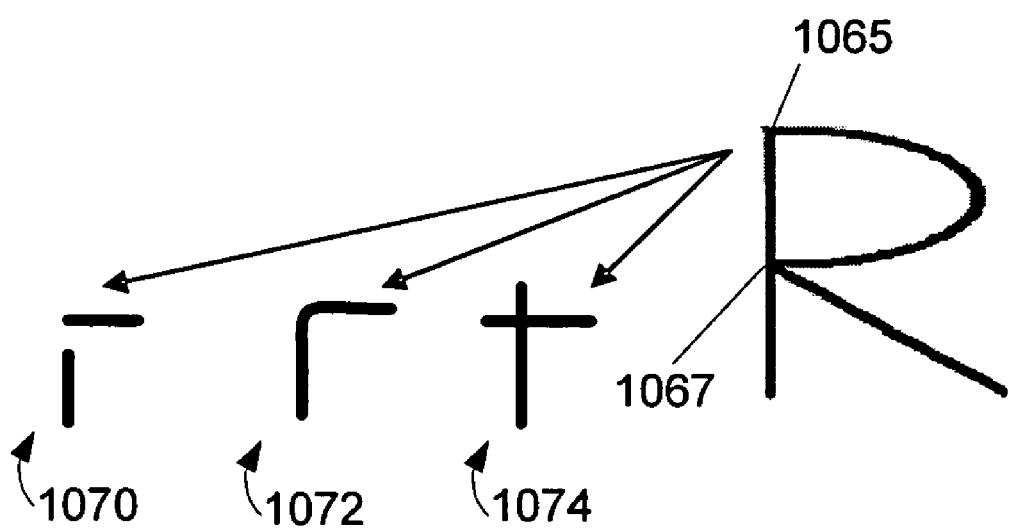
FIG. 16 is a diagram illustrating an example of degree 2 vertices.

Referring now to FIG. 16 another caddie based feature will be discussed. Degree 2 graph vertices represent points of change in the graph form. These vertices may be created by an abrupt change in stroke direction or by the juncture of two strokes 1065. This feature involves first identifying degree 2 graph vertices 1065, 1067 and, second, classifying them in a manner representing their construction. Classifications include disconnected 1070, continuous 1072, and junction 1074. Note that in many cases an abrupt change in stroke direction may occur at the junction of two strokes.

Figure 17:
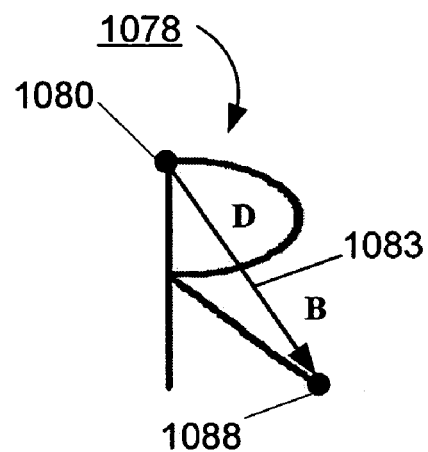
FIG. 17 is a diagram illustrating an example of a vertex-to-vertex direction and distance relationship.

Referring now to FIG. 17, vertex-to-vertex direction and vertex-to-vertex distance will be discussed. FIG. 17 is a diagram of a letter 1078 "R" with one vertex 1080 in the upper left corner of the "R" highlighted by a circle, and another vertex 1088 lower right corner of the "R" highlighted by another circle. Additionally, an arrow 1083 shows the direction and distance from the vertices 1080, 1088. Vertex-to-vertex direction will be discussed first.

An example of vertex-to-vertex direction is shown on FIG. 17. Vertex-to-vertex direction computes a directional value from one vertex 1080 to another 1088. In one embodiment values returned for this feature take the form of a numeric value indicative of direction between two points, the two vertices 1080, 1088. The direction ranges from 0 to 16,383 and is based on a square with each side measuring 4096 units. It will be appreciated that this is an example. Other direction ranges and square sizes are possible. Additionally, other direction measurements are possible.

In addition to vertex-to-vertex direction as shown on FIG. 17, FIG. 17 also shows an example of vertex-to-vertex distance. Vertex-to-vertex distance measures the linear distance between two vertices 1080, 1088. The distance is generally indicated by the length of the arrow 1083. Other distance measurements are possible, this is only an example.

Figure 18:
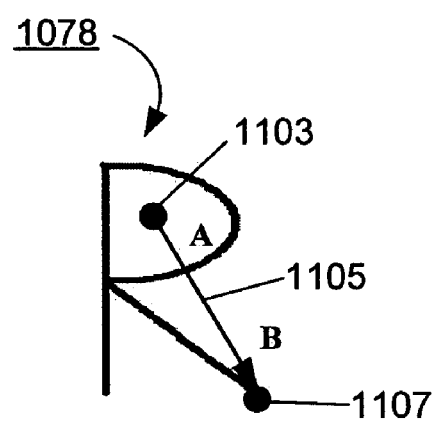
FIG. 18 is a diagram illustrating an example of an edge-to-vertex direction and distance relationship.

Sample edge-to-vertex direction and distance relationships will be discussed with respect to FIG. 18. FIG. 18 includes a diagram of a letter 1078 "R" similar to FIG. 17. The diagram includes a point 1103 at the center of gravity of an edge of the "R" highlighted by a circle and another vertex 1107 lower right corner of the "R" highlighted by a circle. Additionally, an arrow 1105 shows the direction and distance from the vertices 1103, 1107. Edge-to-vertex direction will be discussed first.

Edge-to-vertex direction computes a directional value from the center of gravity of an edge 1103 to one vertex 1107. Values returned for this feature take the form of a numeric value representing a direction between two points, the center of gravity of the edge 1103, and the vertex 1107. The direction ranges from 0 to 16,383 and is base on a square with each side measuring 4096 units. It will be appreciated that this is an example. Other direction ranges and square sizes are possible. Additionally, other direction measurements are possible.

In addition to edge-to-vertex direction as shown on FIG. 18, FIG. 18 also shows an example of edge-to-vertex distance. Edge-to-vertex distance measures the linear distance between the center of gravity of an edge 1103 and a vertex 1107. The distance is generally indicated by the length of the arrow 1107. Other distance measurements are possible, this is only an example.

Figure 19:
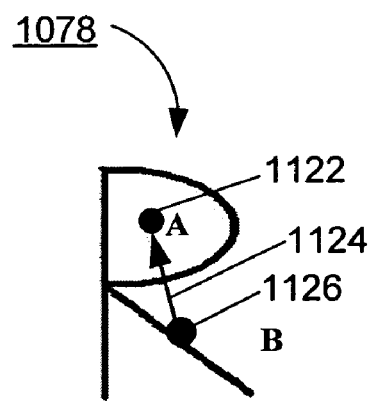
FIG. 19 is a diagram illustrating an example of an edge-to-edge direction and distance relationship.

Sample edge-to-edge direction and distance relationships will be discussed with respect to FIG. 19. FIG. 19 includes a diagram of a letter 1078 "R" similar to FIGS. 17 and 18. The diagram includes one point at the center of gravity of an edge 1122 of the "R" highlighted with a circle and another point at the center of gravity 1126 of another edge of the "R" highlighted with a circle. Additionally, an arrow 1124 shows the direction and distance from the centers of gravity of the edges 1122, 1126. Edge-to-edge direction will be discussed first.

Edge-to-edge direction computes a directional value from the center of gravity of one edge 1122 to the center of gravity of another edge 1126. Values returned for this feature take the form of a numeric value representing a direction between two points 1122, 1126, the center of gravity of each edge 1122, 1126. The direction ranges from 0 to 16,383 and is base on a square with each side measuring 4096 units. It will be appreciated that this is an example. Other direction ranges and square sizes are possible. Additionally, other direction measurements are possible. For example, the starting reference point of a measurement may vary from embodiment to embodiment, as shown by the arrow 1124. In addition to edge-to-edge direction as shown on FIG. 19, FIG. 19 also shows an example of edge-to-edge distance. Edge-to-edge distance measures the linear distance between the center of gravity of an edge 1122 and a center of gravity of another edge 1126. The distance is generally indicated by the length of the arrow 1107. Other distance measurements are possible, this is only an example.

Figure 20:
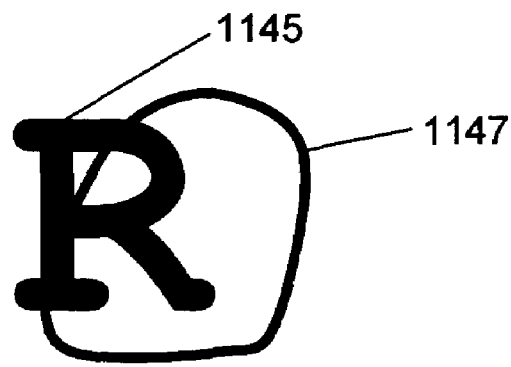
FIG. 20 is a diagram illustrating an example of character convex hull.

Referring now to FIG. 20, contour of a letter will be discussed. FIG. 20 includes a letter 1145 "R". The letter 1145 is shown with a convex hull 1147.

This feature computes the convex hull for the character, in this example, the letter 1145 "R", as well as any internal graph faces in terms of area and location of centroids. In one embodiment, the results can be compared to the school copy 800, discussed above with respect to FIG. 8, for the character (LZ Factor B) as well as other versions of the character.

Figure 21:
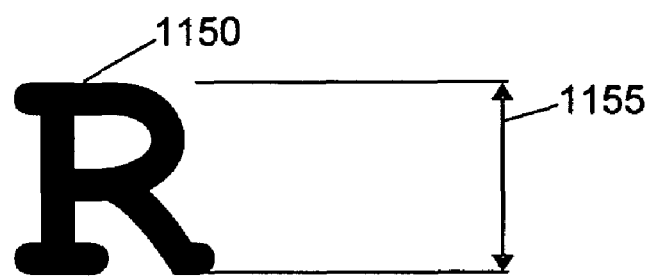
FIG. 21 is a diagram illustrating an example of absolute character height.

FIG. 21 is an example of another feature that may be used as a feature caddie. This feature measures the absolute height of a character. FIG. 21 includes a letter 1150 "R" and an arrow 1155 that indicates the absolute height of the letter 1150.

Figure 22:
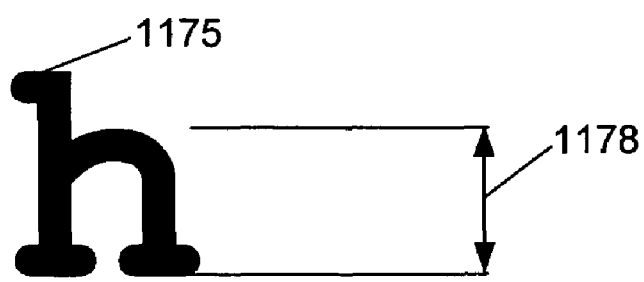
FIG. 22 is a diagram illustrating an example of character middle zone measurement.

Similar to absolute height of a character discussed with respect to FIG. 21, height of a character middle zone will now be discussed with respect to FIG. 22. FIG. 22 includes a lower case letter 1175 "h" and an arrow depict the middle zone height 1178 of the letter 1175. Height of character middle zone measures the absolute length of the character middle zone. The character middle zone is defined by a character graph-specific template (LZ Factor G).

Height of an upper zone and upper zone proportions will now be discussed with respect to FIG. 23. Height of an upper zone will be discussed first.

Figure 23:
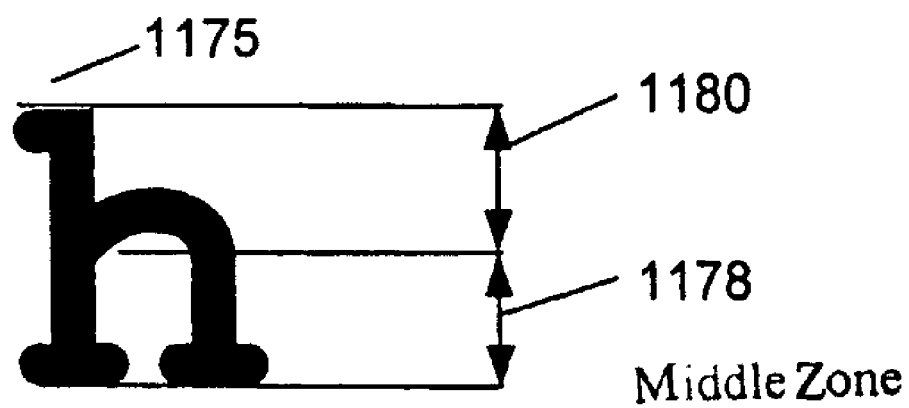
FIG. 23 is a diagram illustrating an example a comparison of character middle and upper zones.

FIG. 23 is a diagram of a character in the form of a letter 1175 "h". Arrows on FIG. 23 depict the upper zone 1180 and the middle zone 1178 of the letter 1175 "h". The letter 1175 "h" and the middle zone 1178 of FIG. 23 are the same or similar to the letter 1175 "h" and the middle zone 1178 of FIG. 22.

The height of the upper zone 1180 measures absolute length of a character upper zone 1180. The upper zone 1180 is defined by a character graph-specific template. Additionally, FIG. 22 depicts an upper zone proportion. The upper zone proportion measures a ratio of upper zone 1180 to middle zone 1178.

Figure 24:
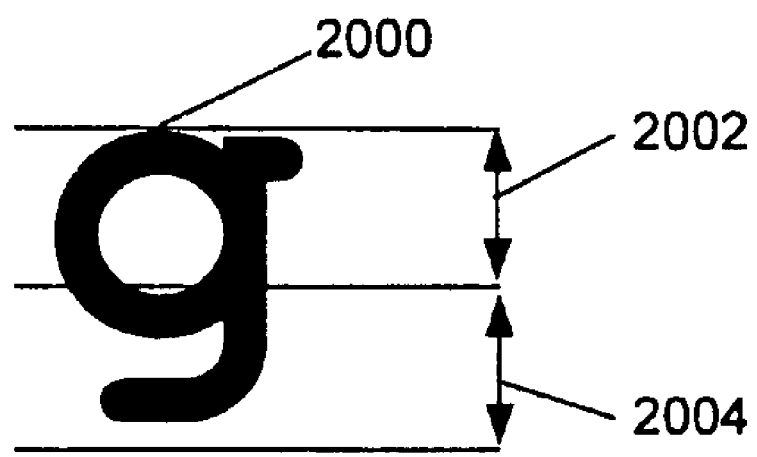
FIG. 24 is a diagram illustrating an example of a comparison of character middle and lower zones.

Referring now to FIG. 24 height of lower zone 2004 and lower zone 2004 proportion will be discussed. FIG. 24 is similar to FIG. 23. FIG. 24 includes a character in the form of a letter 2000 "g". Additionally, the Figure includes a middle zone 2002. The middle zone 2002 of FIG. 24 is similar to the middle zones 1178 of FIGS. 22 and 23, however, FIGS. 22 and 23 include the letter 1175 "h" while FIG. 24 is a letter 2000 "g".

The height of the lower zone 2004 measures the absolute length of the character lower zone 2004. In this case the absolute length of the lower zone of the letter 2002 "g". The lower zone is defined by the character graph specific template. The lower zone 2004 proportion measures the ratio of the lower zone 2004 to the middle zone 2002.

Figure 25:
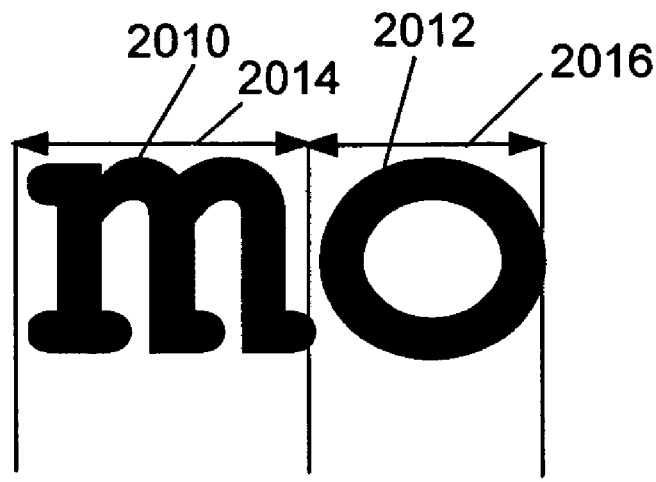
FIG. 25 is a diagram illustrating an example of a measure of character breadth.

Referring now to FIG. 25 a breadth of letters measurement will be discussed. Breadth of letters measures the full width of a character. (LZ Factor N). FIG. 25 includes two characters, a lower case letter 2010 "m" and a lower case letter 2012 "o". The breath of the letter 2010 "m" is indicated by an arrow 2014. The breath of the letter 2012 "o" is indicated by the arrow 2016.

Figure 26:
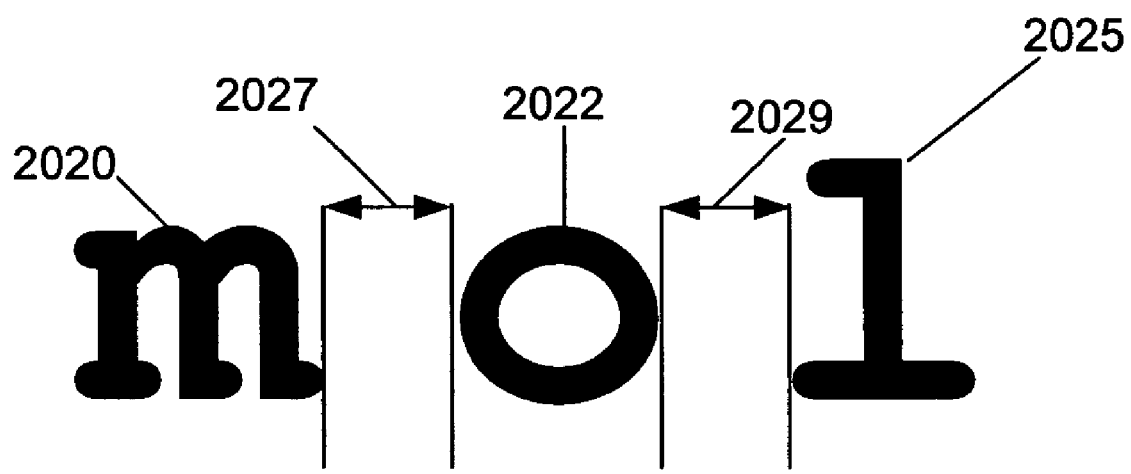
FIG. 26 is a diagram illustrating an example of a measure of distance between letters.

FIG. 26 depicts examples of distance between characters. In this example, distance between letters is shown. The Figure includes characters in the form of letters 2020, 2022, 2025 "m", "o", and "l". Examples of the distance between letters are depicted by the arrows 2027, 2029.

Character slat is another example of a possible feature caddie. Character slant returns the angle and direction of slant for a character based upon a pre-defined template slant line (LZ Factor O). Slant lines are character-specific and certain characters can have more than one slant line.

Figure 27:
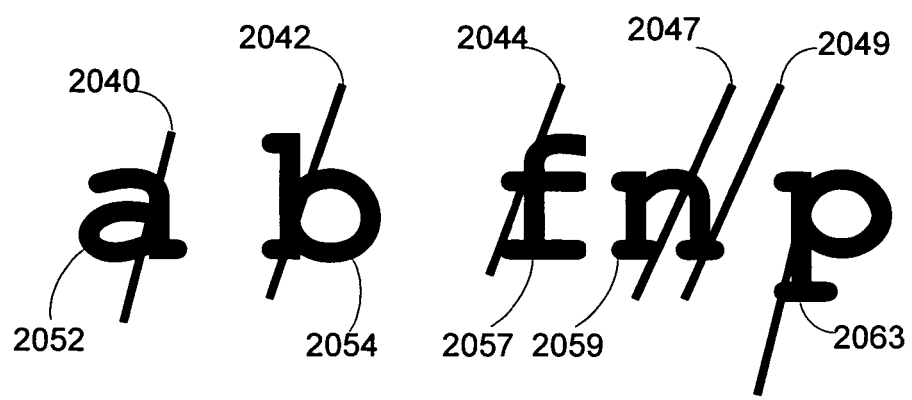
FIG. 27 is a diagram illustrating an example of character slant.

Examples of possible character slant lines 2040, 2042, 2044, 2047, 2049 are depicted in FIG. 27. FIG. 27 also includes a plurality of characters in the form of letters 2052, 2054, 2057, 2059, 2063. These are only examples, as discussed above many different characters are possible and some characters may have more than one slant line, for example the letter 2059 "n" in FIG. 27 has slant lines 2047, 2049.

Figure 28:
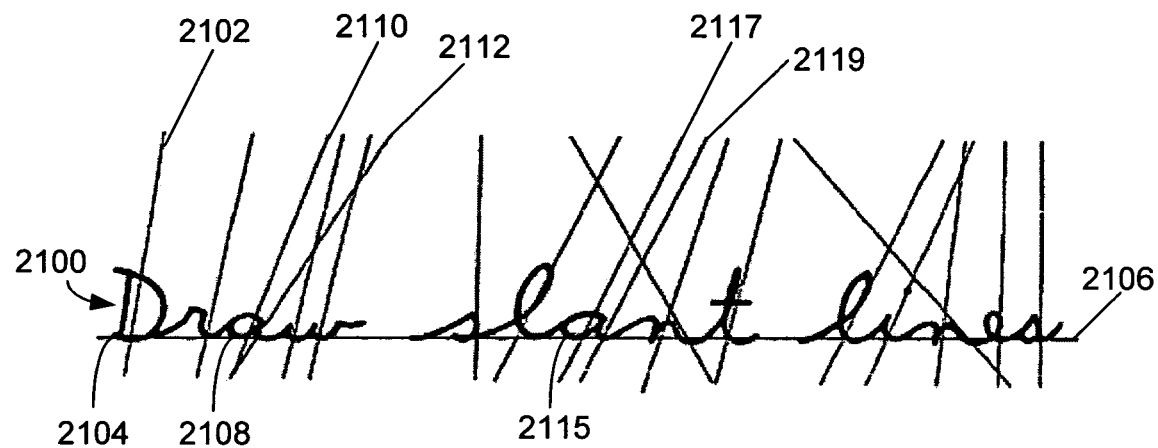
FIG. 28 is a diagram illustrating an example of fluctuation of slant.

Slant was discussed with respect to FIG. 27. In many cases slant may vary. Another possible feature caddie is fluctuation of slant. Fluctuation of slant measures the variation in slant for a group of objects: characters, sub-characters or strokes (LZ Factor P). FIG. 28 is a diagram illustrating an example of fluctuation of slant. The diagram includes the phrase "Draw slant lines" 2100. The diagram also includes a number of lines representing a slant for each letter in the phrase "Draw slant lines" 2100, for example the line 2102 represents the slant for the letter "D" 2104. Note that the line 2106 is not a slant line. FIG. 28 also includes examples of letters with multiple slant angles, for example the letter "a" 2108 in the word "Draw" has a pair of slant lines 2110, 2112.

The letter "a" 2108 in the word "Draw" can be compared to the letter "a" 2115 in the word "slant". The each of the slant angles 2110, 2112 of the letter "a" 2108 are different from the slant angles 2117, 2119 of the letter "a" 2115 in "slant". Several differences can be seen, for example, the angle of the slant line 2110 is different from the corresponding slant line 2117. Additionally, the angle between the slant lines 2110, 2112 is different from the angle between the slant lines 2117, 2119. These are only examples, other comparisons are possible.

Figure 29:
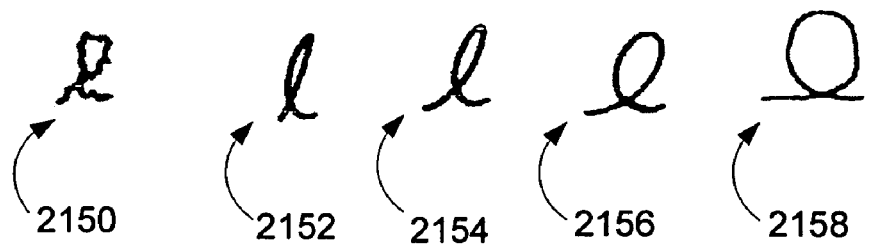
FIG. 29 is a diagram illustrating an example of loop classification.

OCR based biometric handwriting identification can also use loop classification as a caddie-based feature. Referring now to FIG. 29, an example of loop classification will be discussed. Loop classification assigns a scalar value to assess stroke character and embedded patterns such as waviness (LZ Factor F). Loop classifications include tremor 2150, tight 2152, elastic 2154, inflated 2156, flabby 2158. These are only examples, other loop classifications are possible.

Figure 30:
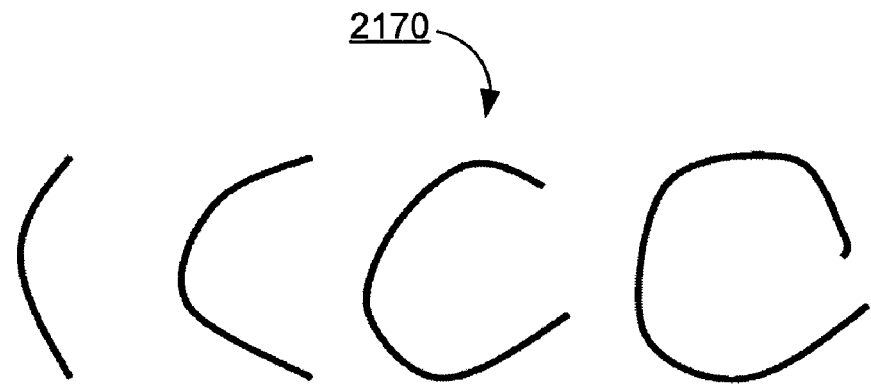
FIG. 30 is a diagram illustrating an example of curve concavity.

Referring now to FIG. 30 curve concavity will be discussed. This feature is similar to loop classification discussed with respect to FIG. 29, but applies to simple curves rather than loops. The result is a measure of curvature for simple curves that produces a scalar value measuring the depth of curvature of a stroke. FIG. 30 includes several examples of different possible curve concavities 2170. It will be clear that these are only examples.

Figure 31:
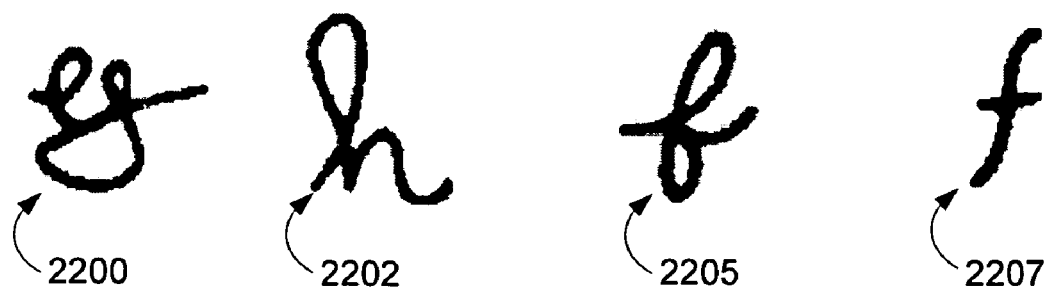
FIG. 31 is a diagram illustrating examples of ornamentation and simplified character forms.

Referring now to FIG. 31 examples of ornamentation and simplification will be discussed. Ornamentation and simplification returns a scalar value evaluating the difference between a character form and School copy for that character (LZ Factor A). Ornamentation may generally be considered the opposite of simplification. Typically a single scalar value can represent ornamentation and simplification, with ornamentation on one end of the range of scalar values selected and simplification on the other end of the range of scalar values selected. Examples of ornamentation and simplification include, but are not limited to ornamental 2200, distorted 2202, school copy 2205, and simplified 2207.

Figure 32:
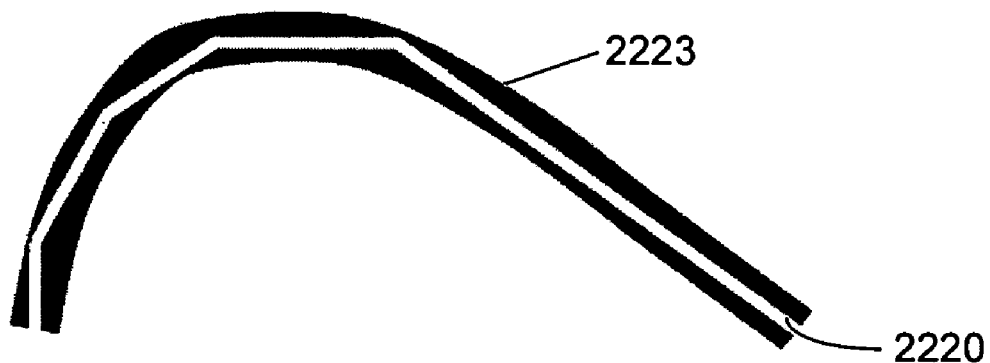
FIG. 32 is a diagram illustrating an example of a contour point profile.

Referring now to FIG. 32 an example of an embedded contour line 2220 will be discussed. The embedded contour line 2220 is embedded within a curve 2223. The curve 2223 is represented by the thick black line The embedded contour line 2220 is represented by the white line that is located on top of the curve 2223. In one embodiment the embedded contour line establishes the least number of lines that can be embedded in a curve. The embedded contour line may also be referred to as the tour point profile.

Figure 33:
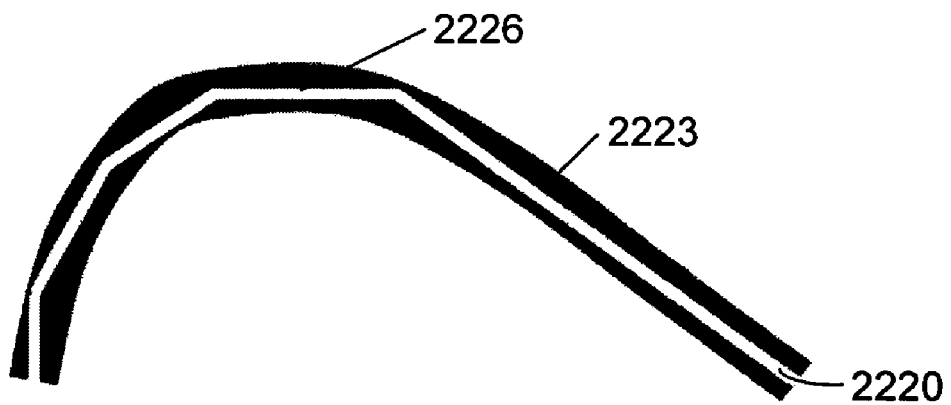
FIG. 33 is a diagram illustrating an example of horizontal stroke components.

Referring now to FIG. 33 an example of horizontal stroke components 2226 will be discussed. FIG. 33 is similar to FIG. 32. FIG. 33 includes a curve 2223 that is the same or similar to the curve 2223 of FIG. 32. Also, similar to FIG. 32 an embedded contour line 2220 is shown on FIG. 33. Items having the same reference character will generally be the same or similar. FIG. 33 further highlights a horizontal stroke component 2226. A horizontal stroke component quantifies portions of stroke with a horizontal tangent slope.

Figure 34:
FIG. 34 is a diagram illustrating an example of vertical stroke components.

Referring now to FIG. 34 an example of vertical stroke components 2228 will be discussed. FIG. 34 is similar to FIGS. 32 and 33. FIG. 34 includes a curve 2223 that is the same or similar to the curve 2223 of FIGS. 32 and 33. Also, similar to FIGS. 32 and 33 an embedded contour line 2220 is shown on FIG. 34. While FIG. 33, discussed above, highlighted a horizontal stroke component 2226, FIG. 34 highlights a vertical stroke component 2228. A vertical stroke component 2228 quantifies portions of stroke with a vertical tangent slope, as shown on FIG. 34.

Figure 35:
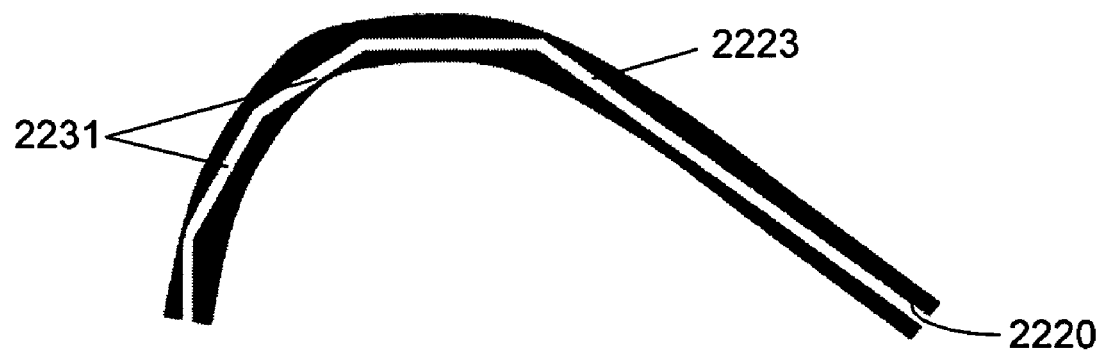
FIG. 35 is a diagram illustrating an example of positive stroke components.
Figure 36:
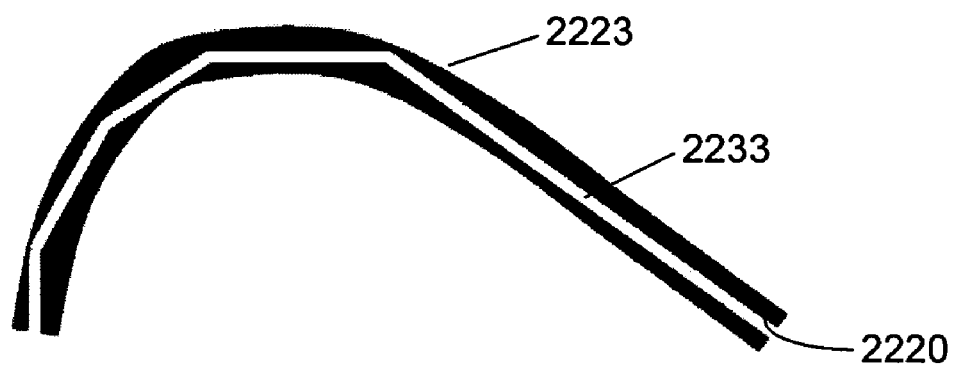
FIG. 36 is a diagram illustrating an example of negative stroke components.

FIGS. 35 and 36 are also similar to FIGS. 32, 33, and 34, discussed above. FIG. 35 shows an example of an embedded positive component 2231 and FIG. 36 shows an example of an embedded negative component 2233. The positive stroke components 2231 of FIG. 35 quantifies a proportion of stroke with positive tangent Alternatively the negative stroke components of FIG. 36 quantifies a portion of stroke with a negative tangent slope. In the example of FIG. 35 multiple embedded positive component are shown. It will be clear that multiple components, including, but not limited to positive, negative, and horizontal, vertical may occur in a character, group of characters, and portions of characters. It will also be clear that multiple components may be combined to form feature caddies.

Figure 37:
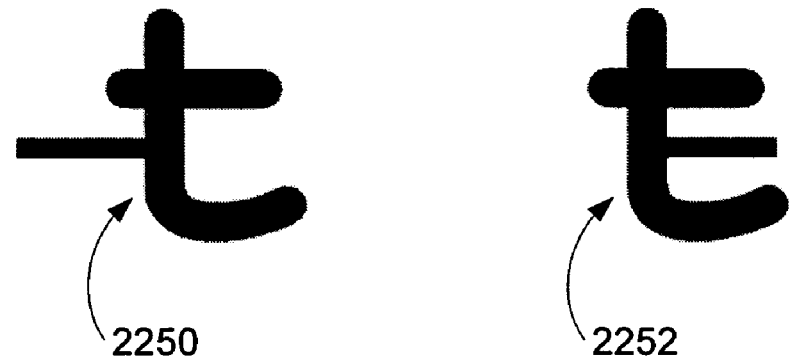
FIG. 37 is a diagram illustrating an example of character tendency.

Character tendency will now be discussed with respect to FIG. 37. Character tendency measures deviation in weighting of character features against school copy and returns a scalar value ranging from left to right (LZ Factor Q). FIG. 37 includes an example of left tending 2250 and a right tending 2252 characters. In this example the characters are the letter "t".

Figure 38:
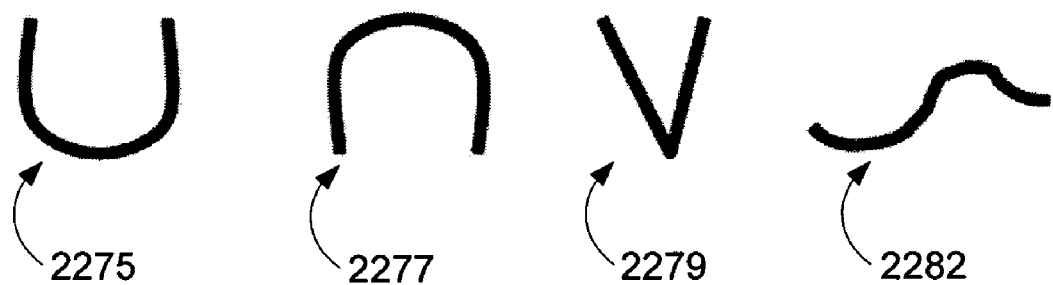
FIG. 38 is a diagram illustrating an example of character connection consistency.

Character connection class will now be discussed with respect to FIG. 38. Character connection class classifies character connections from pre-defined models: garland 2275, arcade 2277, angle 2279, and thread 2282 (LZ Factor C).

Figure 39:
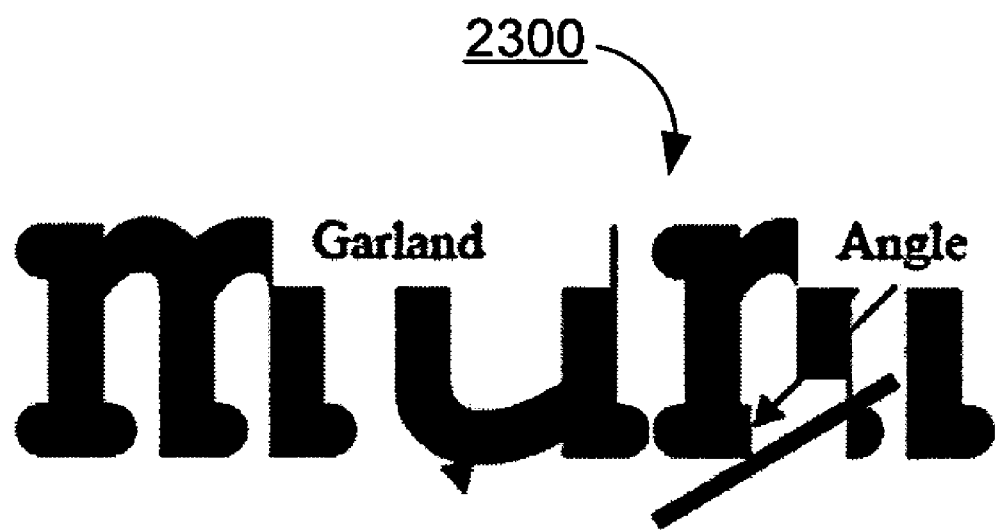
FIG. 39 is a diagram illustrating an example of broken character connections.

Character connection consistency will now be discussed with respect to FIG. 39. FIG. 39 includes characters 2300 in the form of letters "mum". Character connection consistency identifies broken character connections (LZ Factor V).

An example of baseline direction will now be discussed with respect to FIG. 40A. Baseline direction quantifies the angle and direction 2318 of a character, portion of a character, or more typically, a plurality of characters 2322 with respect to a baseline 2324 (LZ Factor I).

Figure 40A:
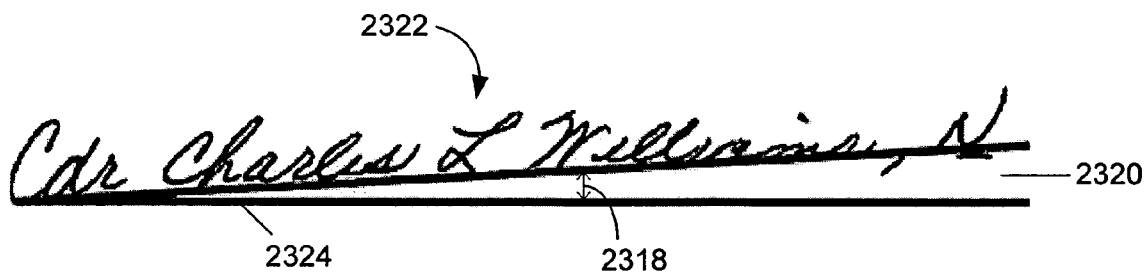
FIG. 40A is a diagram illustrating an example of baseline direction.
Figure 40B:
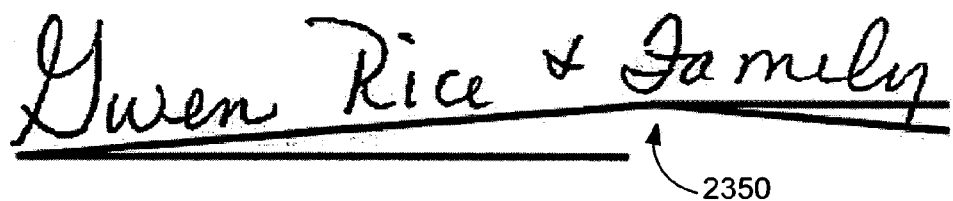
FIG. 40B is a diagram illustrating an example of baseline fluctuation.

Similar to FIG. 40A, FIG. 40B illustrates an example of a baseline fluctuation 2350. Baseline fluctuation 2350 returns a scalar value quantifying a fluctuation of baseline. (LZ Factor K).

Figure 41:
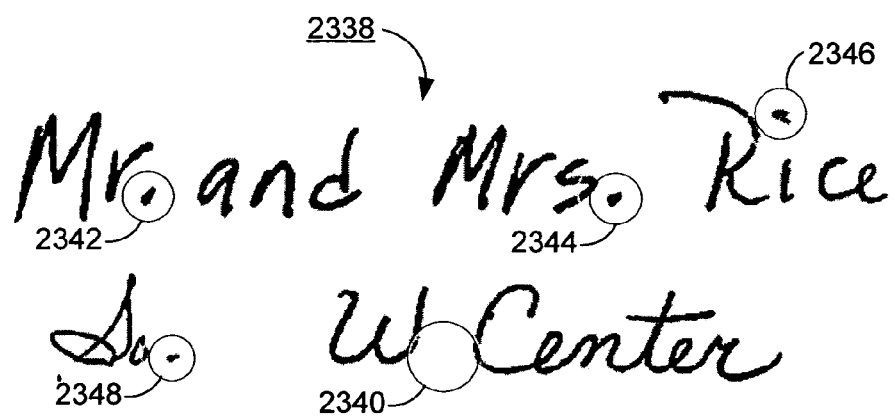
FIG. 41 is a diagram illustrating an example of the presence or absence of punctuation.

Example of the presence or absence of punctuation will now be discussed with respect to FIG. 41. Punctuation and diacritics detects expected but missing punctuation. For example FIG. 41 includes the text 2338 "Mr. and Mrs. Rice So. W Center". The circle 2340 shows a location where a period (".") is expected. The text 2338 also includes circles 2342, 2344, 2348, where periods are expected and located. Additionally, the circle 2346 indicated that a "dot" located on top of a lower case "i" can also be a writing sample feature in some embodiments.

Figure 42:
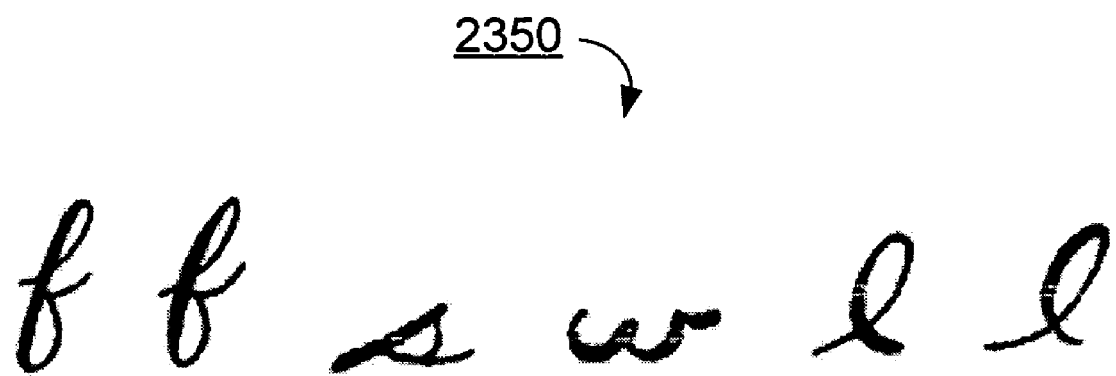
FIG. 42 is a diagram illustrating an example of pen pressure patterns within characters.

Referring now to FIG. 42, examples of pen pressure patterns within characters will now be discussed. FIG. 42 includes several example characters 2350. Using the measured degree of pressure, "pressure zones" are established for each stroke. These zones indicate the relative pressure applied through the construction of the stroke. This feature measures both the average width for the stroke and locates pressure zones within the stroke (LZ Factor D "stroke width" and LZ Factor U "Pressure Control").

Figure 43:
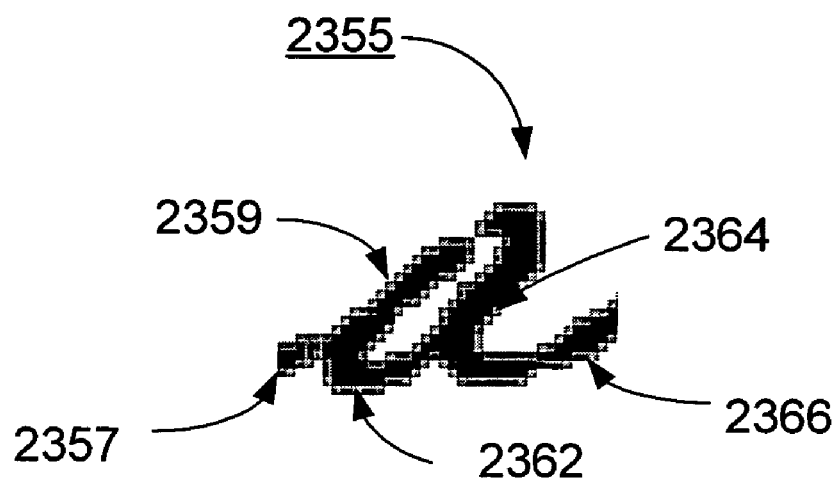
FIG. 43 is a diagram illustrating an example of stroke sequence for a character.

Stroke sequence will now be discussed with respect to FIG. 43. Stroke sequence approximates the sequence in which the strokes comprising an individual character were written. As one possible example the letter 2355 "a" of FIG. 43 may be written by a series of strokes 2357, 2359, 2362, 2364, 2366.

Figure 44:
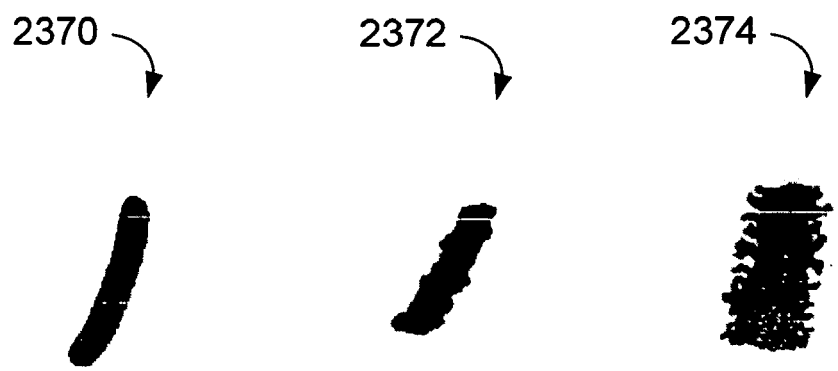
FIG. 44 is a diagram illustrating an example of boarder stability.

FIG. 44 shows three examples 2370, 2372, 2374 of variation in border stability. Border stability measures the smoothness (or coarseness) of the stroke contours. In one embodiment a scalar value ranging from sharp to ragged is returned. (LZ Factor E).

Figure 45:
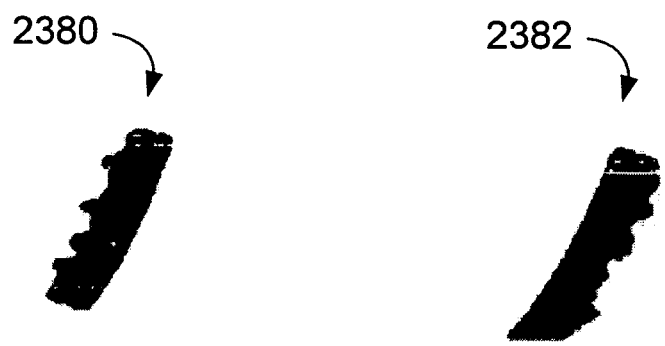
FIG. 45 is a diagram illustrating an example of boarder symmetry.

Referring now to FIG. 45 border symmetry will be discussed. The boarder of two contours 2380, 2382 is shown. Boarder symmetry compares two opposing contours for a single stroke.

Figure 46:
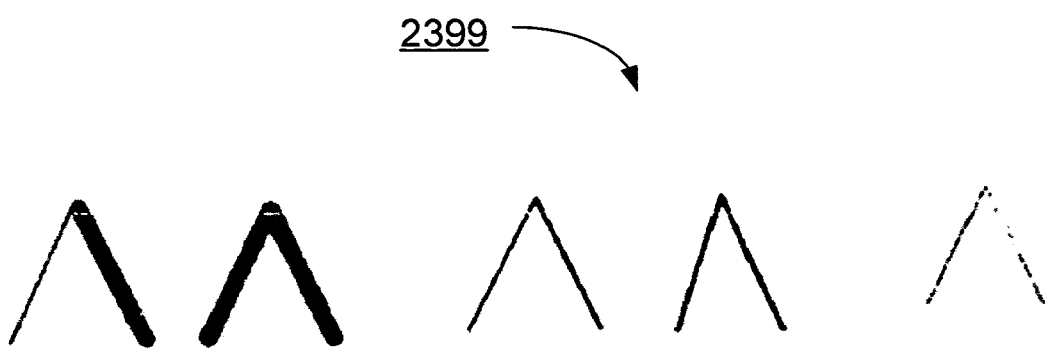
FIG. 46 is a diagram illustrating an example of degree of pressure.

Referring now to FIG. 46 degree of pressure will be discussed. FIG. 46 includes several example strokes 2399. Degree of pressure approximates the amount of pressure applied by the writer in construction of strokes 2399 (LZ Factor T). Data items to measure degree of pressure include entropy of gray values (CEDAR), grey level threshold (CEDAR), number of black pixels (CEDAR), and stroke width (LZ Factor D).

Figure 47:
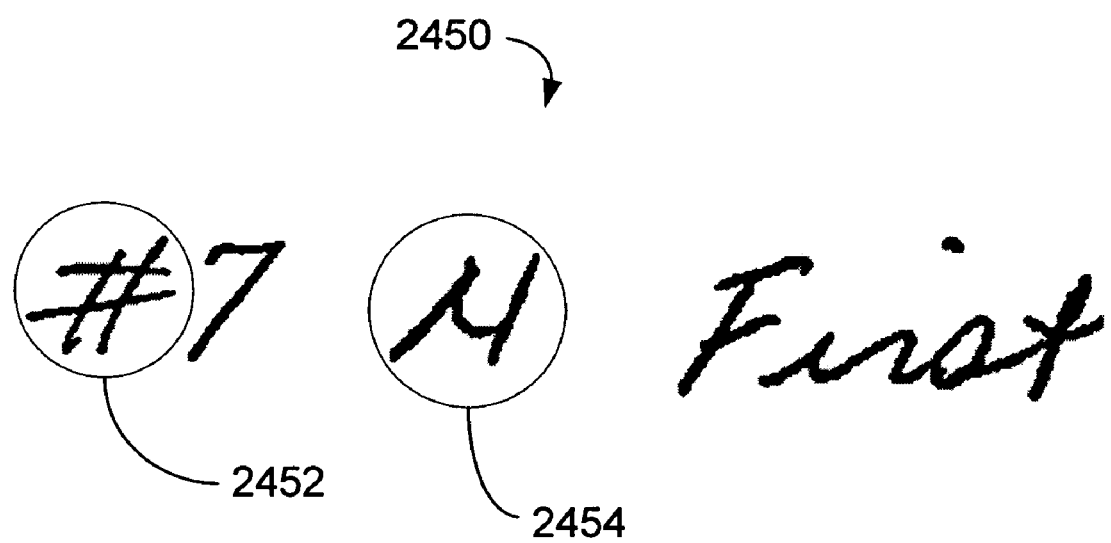
FIG. 47 is a diagram illustrating an example of abbreviations and symbols.

Abbreviation and use of symbols will now be discussed with respect to FIG. 47. This feature detects abbreviated words and the substitution of symbols such as ampersands and plus signs in place of words. FIG. 47 includes a line of text 2450 "#7 µ First" The use of abbreviations and symbols 2452, 2554 is a characteristic that may in some cases be used for biometric handwriting identification.

Figure 48:
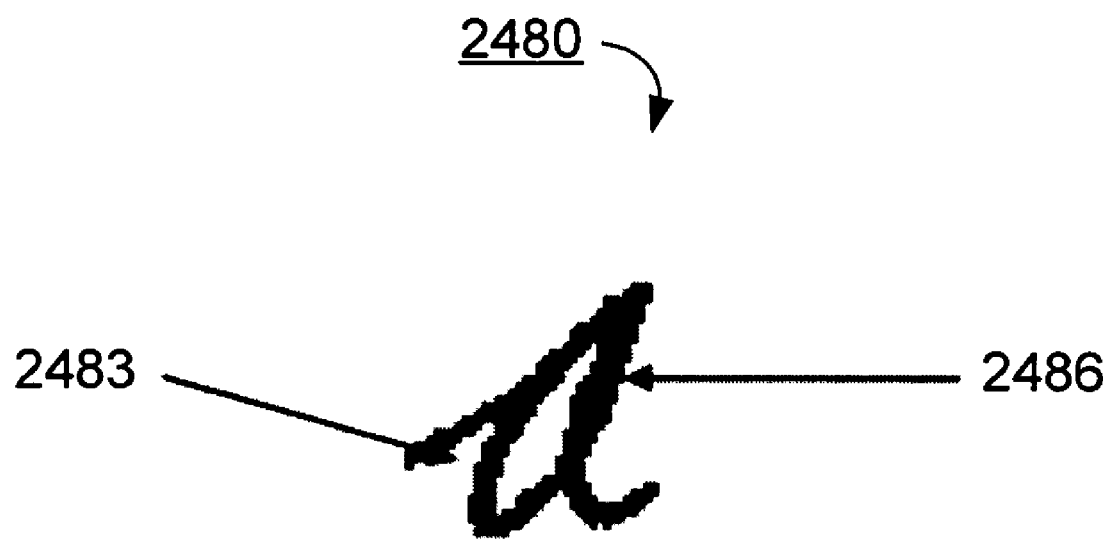
FIG. 48 is a diagram illustrating an example of retracing within a character.

Re-tracings will now be discussed with respect to FIG. 48. Re-tracings occur when pen paths overlap indicating that two strokes share the same path for a limited distance. FIG. 48 shows an example of re-tracing. FIG. 48 includes a character in the form of a letter 2480 "a" On the left side of the letter 2480 a re-tracing 2483 is detected because two or more strokes merge into one. A second re-tracing 2486 is detected on the right side of the letter 2480. These are only examples of methods of detecting re-tracings. Once re-tracings are detected, by any one or more of various ways, the detected re-tracings may in some embodiments be used for bio-metric handwriting identification.

Some caddie based features may be referred to as sub-character caddie-based features. Generally sub-character caddie based features encompass those features that are can be captured in feature caddies but do not represent entire characters. Character-based Feature Caddies exist where the underlying writing can be accurately identified using optical character recognition technology. In those cases were precise identification cannot be made, a different class of features is detected—the sub-character class. The sub-character features are the components of allographs but are not allographs themselves and include the "atoms" of words. That is, they consist of a set of basic word building blocks and include: garlands and arcades (horizontal curves), loops, cusps, crossings, T-Intersections, and terminal points. Again, these are only examples.

Figure 49:
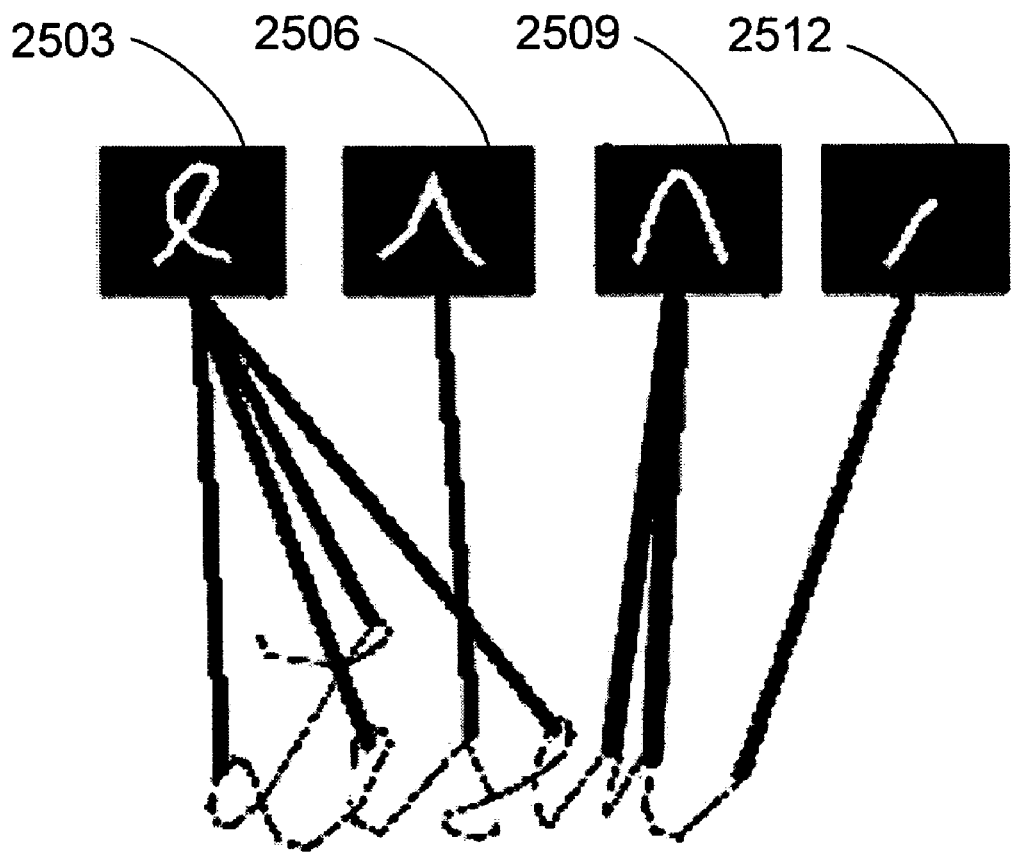
FIG. 49 is a diagram illustrating examples of loops, cusps, garlands, and an end point.

FIG. 49 illustrates some of these forms. Referring now to FIG. 49 examples of selected character atoms will now be discussed. FIG. 49 includes examples of loops 2503, cusps 2506, garlands 2509, and example of an end 2512. These are only examples.

The following features are generally considered to be within the non-caddie-based classification. This is not intended to be an exhaustive list. These features are obtained in words and parts of words where caddies could not be detected.

Figure 50:
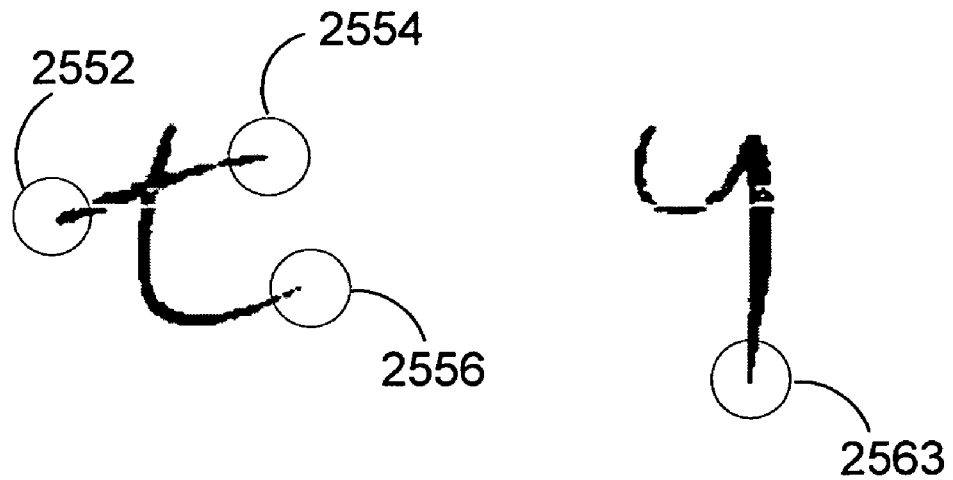
FIG. 50 is a diagram illustrating an example of character terminal conditions.

Referring now to FIG. 50 several examples of a terminal condition 2552, 2554, 2556, 2560, 2563 will be discussed. The terminal condition feature measures line condition at all terminal conditions 2552, 2554, 2556, 2560, 2563 including beginning and end of words all conditions where a line narrows significantly, or converges into a point, for example terminal condition 2563. Measures the length of the Taper as well as the beginning and end stroke width. The terminal conditions 2552, 2554, 2556, 2560, 2563 are only examples, other terminal conditions are possible.

Figure 51:
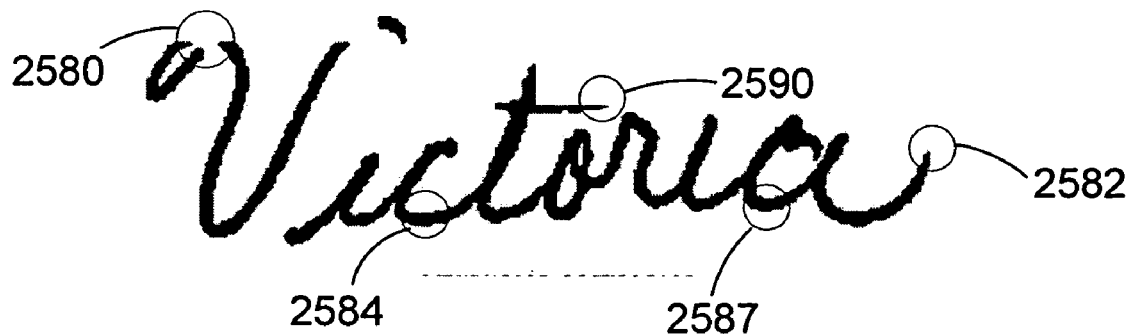
FIG. 51 is a diagram illustrating an example of stroke types within a word.

Referring now to FIG. 51 stroke type will now be discussed. Stroke type classifies individual strokes as word beginning 2580, word end 2582, character connector 2584, character embedded 2587, and character terminal 2590.

Figure 52:
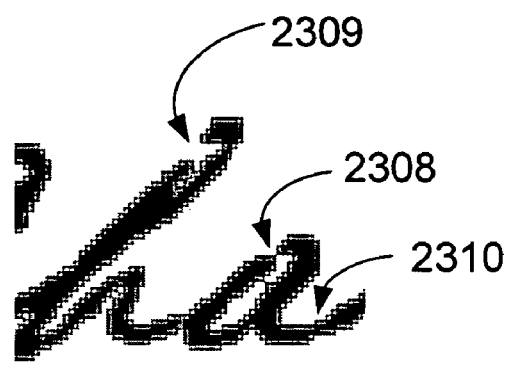
FIG. 52 is a diagram illustrating an example of stroke artifacts.

Stroke artifacts will now be discussed with respect to FIG. 52. Stroke artifact identifies small breaks in continuity 2304, 2308, overshoots, undershoots as well as niches 2310 and holes in a stroke.

Figure 53:
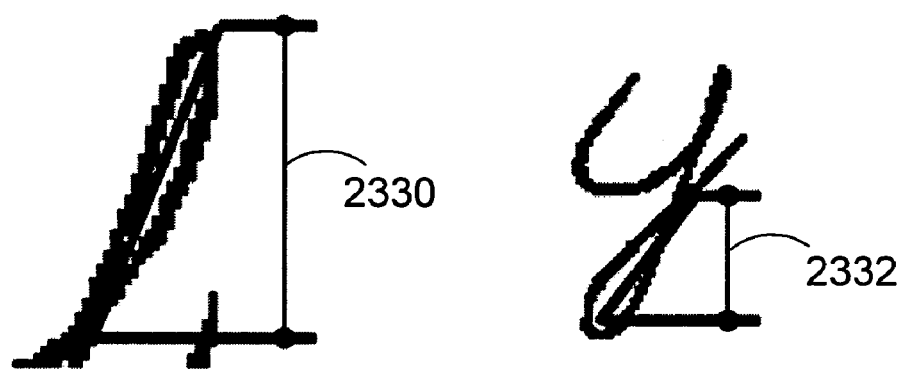
FIG. 53 is a diagram illustrating an example of loop attributes.

Referring now to FIG. 53 loop attributes will be discussed. This feature measures the specific geometric attributes of Loops. FIG. 53 depicts example measurements of the specific geometric attributes, including the height 2330, 2332 of an attribute of two character and Distance between words will now be discussed with respect to FIG. 54. Distance between words measures clear area between words (LZ Factor R).

Figures 54, 55:
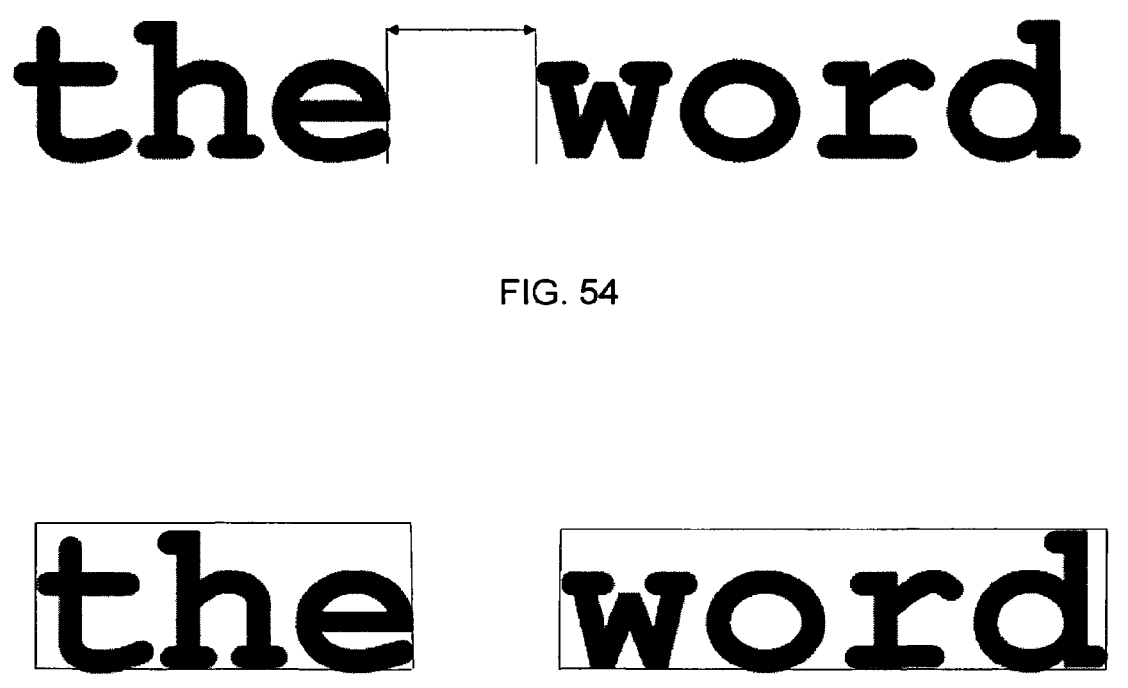

Referring now to FIG. 55 an example of word proportion bounding boxes will now be discussed. Word proportions measures the relationship between length and height of words.

Character Connection Consistency Identifies broken character connections (LZ Factor V).

Figure 56:
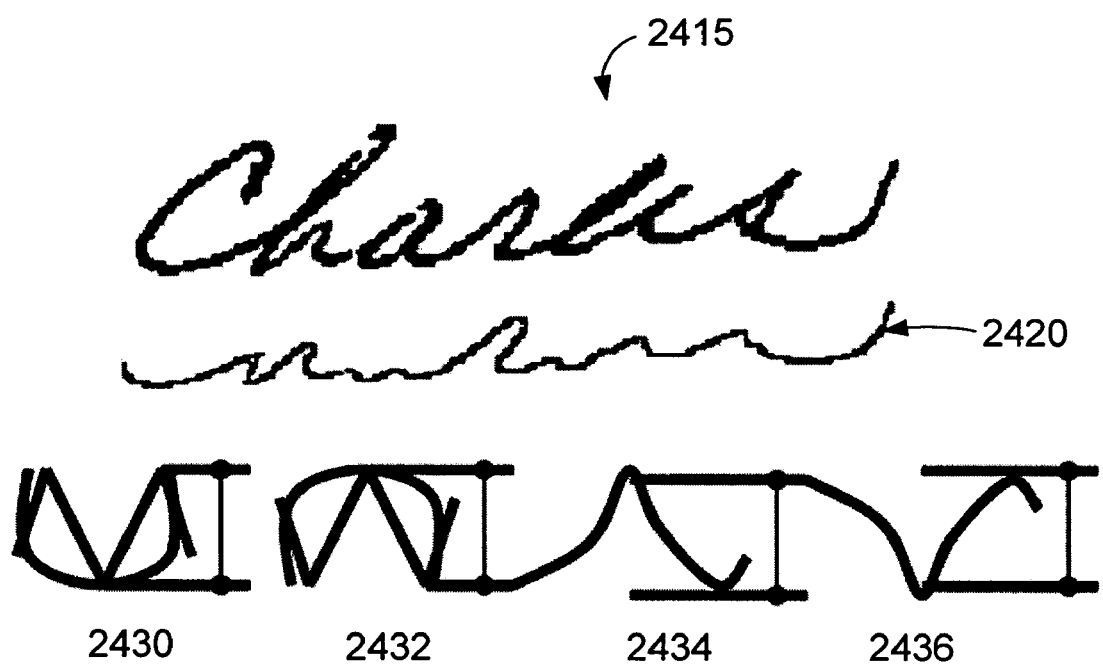
FIG. 56 is a diagram illustrating an example of word foundation and related features.
Figure 57:
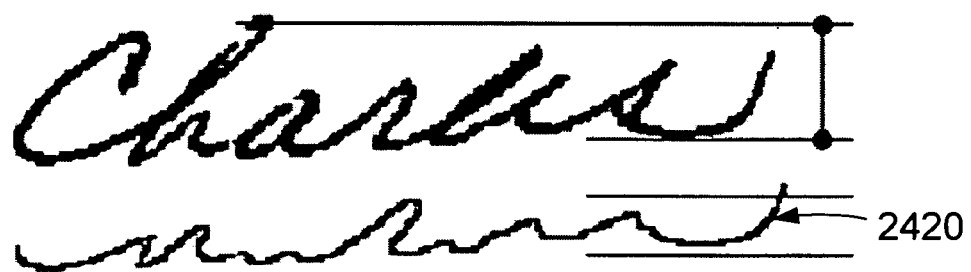
FIG. 57 is a diagram illustrating an example of word foundation and word body proportions.

FIGS. 56 and 57 discussed word foundations. Word foundations represents the graph pathway that transcends a word closest to the baseline. Referring now to FIG. 56 garlands 2430, arcades 2432, cusps 2434, and valleys 2436 will be discussed. FIG. 56 includes a word 2415, in this case a name, "Charles". A word foundation 2420 is also shown. The word foundation 2420, as described above is a graph that transcends a word closest to the baseline. Garlands 2430, arcades 2432, cusps 2434, and valleys 2436 located within the word foundation 2420 can be features that are used in biometric handwriting identification. For example, if a garland 2430 is identified in a text sample it can be compared to another garland 2430 in another text sample.

Referring now to FIG. 57 proportion will be discussed. This feature compares the ratio of the vertical dimension of the word foundation with the vertical height of the word.

Figures 58, 59:
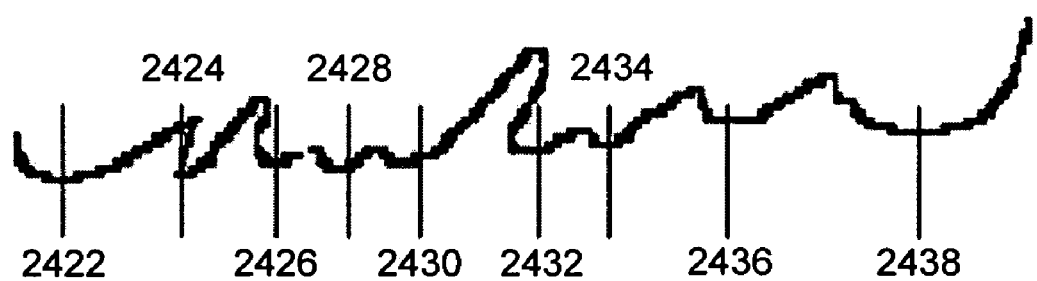
FIG. 58 is a diagram illustrating an example of minimal point patterns in word foundations.
FIG. 59 is a diagram illustrating an example of features matched for consistency comparison.

Rhythm will now be discussed with respect to FIG. 58. Rhythm reflects recurring internal patterns of a writing sample. For example, FIG. 58: depicts minimal point patterns 2422, 2424, 2426, 2428, 2430, 2432, 2434, 2436, 2438 in the word foundation 2420. The word foundation 2420 of FIG. 58 is a word foundation of the word "Charles". Additionally, the word foundation 2420 is the same or similar to the word foundation 2420 discussed with respect to FIGS. 56 and 57.

Consistency will now be discussed with respect to FIG. 59. Consistency measures the similarity or difference between loops (Feature 45) and cusps, garlands and arcades (Feature 48). FIG. 59 is similar to FIG. 56, however, with respect to FIG. 56, the garlands 2430, arcades 2432, cusps 2434, and valleys 2436 located within the word foundation 2420. In the present Figure, FIG. 59 the similarity or difference between loops, cusps, garlands, and arcades for characters, or groups of characters 2448 are used. It will be clear that these are only examples. Other embodiments are possible, for example, in one embodiment valleys may be compared. Additionally, in another example, some portion of characters other than the word foundation 2420 may be used.

Figure 60:
FIG. 60 is a diagram illustrating an example of fine edge contour details.

Referring now to FIG. 60, fine edge contours will be discussed. This feature involves measuring the "fine" edge contours scanned at very high levels of resolution are used for biometric handwriting identification. FIG. 60 is an example of a fine edge contour. FIG. 60 includes a portion 2480 of a character or characters. The portion 2480 shown is scanned at very high resolution and can be compared to other portions of a character or characters scanned at very high resolution.

Figure 61:
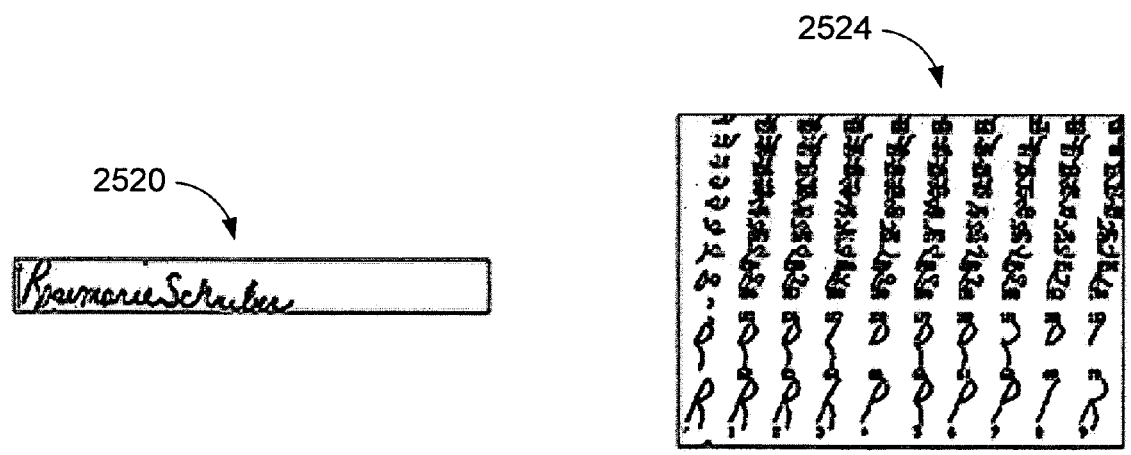
FIG. 61 is a diagram illustrating an example of embedded isomorphisims.

Embedded Isomorphisms will now be discussed with respect to FIG. 61. This feature involves isolating isomorphisms embedded in a handwriting sample 2520 and detecting similar isomorphisms among samples 2524.

Several examples have been discussed with reference to the letter "R". Examples using other letters have also been discussed, for example a lower case letter "g". It will be understood that, in general these are only examples and the feature or concept being illustrated will typically apply to other letters, characters, and in some cases groups of characters. Additionally, in some cases the examples may apply to parts of characters.

In the examples above several character-level caddies, sub-character level caddies, word-level caddies, and non-caddie features that may in some embodiments be used for biometric handwriting identification. The list is not intended to be an exhaustive list. Other caddie and non-caddie features are possible. Additionally, typically several, and based possibly all of the caddie and non-caddie based features may be used in an embodiment, however, it will be clear to those of skill in the art that other embodiments that use a subset of the example caddie or non-caddie features are also possible. Embodiments that use other caddie or non-caddie features that are not listed are also possible.

While certain embodiments have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A method for biometric handwriting recognition, comprising:
    converting handwriting specimens into electronic images;
    converting the electronic images into mathematical graphs that include a vertex and an edge;
    detecting similarities between a plurality of graphs;

aligning vertices and edges of similar graphs; and
comparing similar graphs.

2. The method of claim 1, wherein converting the handwriting specimens into electronic images comprises, converting the handwriting samples into bi-tonal electronic images.

3. The method of claim 1, wherein converting an electronic image into mathematical graphs comprises converting the electronic image into an image skeleton.

4. The method of claim 3, wherein converting an electronic image into a mathematical graph further comprises transforming the image skeleton into one or more edges and one or more vertices.

5. The method of claim 3, wherein converting an electronic image into a mathematical graph further comprises locating a first primary vertex.

6. The method of claim 5, wherein converting an electronic image into a mathematical graph further comprises following a pixel path from the first primary to the second primary vertex.

7. The method of claim 6, comprising detecting what type of vertex each located vertex is, wherein the type of vertex is detected by checking a plurality of pixels around a pixel of interest.

8. The method of claim 5, further comprising locating a secondary vertex.

9. The method of claim 1, wherein converting the electronic images into mathematical graphs includes minor feature editing.

10. The method of claim 9 wherein the minor feature editing comprises closing a small gap.

11. The method of claim 9 wherein the minor feature editing comprises connecting undershoots.

12. The method of claim 9 wherein the minor feature editing comprises combining a plurality of close vertices.

13. The method of claim 1, wherein the comparing step includes the additional steps of:
associating contour information with each graph; and
comparing the contour information associated with similar graphs.

14. The method of claim 1, wherein the detecting step comprises the use of optical character recognition.

15. The method of claim 1, further comprising transforming a mathematical graph into at least one feature caddie.

16. The method of claim 15 wherein the feature caddie comprises a topology.

17. The method of claim 16 wherein the topology comprises a topology for an individual character.

18. The method of claim 16 wherein the topology comprises a topology for a group of characters.

19. The method of claim 15 wherein the feature caddie comprises a minimum morphing distance.

20. The method of claim 15 wherein the feature caddie comprises a degree 2 graph vertices.

21. The method of claim 15 wherein the feature caddie comprises a vertex-to-vertex direction.

22. The method of claim 15 wherein the feature caddie comprises a vertex-to-vertex distance.

23. The method of claim 15 wherein the feature caddie comprises an edge to vertex direction.

24. The method of claim 15 wherein the feature caddie comprises an edge to vertex distance.

25. The method of claim 15 wherein the feature caddie comprises an edge to edge direction.

26. The method of claim 15 wherein the feature caddie comprises an edge to edge distance.

27. The method of claim 15 wherein the feature caddie comprises an edge to edge direction.

28. The method of claim 15 wherein the feature caddie comprises a contour of a letter.

29. The method of claim 15 wherein the feature caddie comprises a character height.

30. The method of claim 29 wherein the height is an absolute height.

31. The method of claim 29 wherein the height is a middle zone height.

32. The method of claim 29 wherein the height is an upper zone height.

33. The method of claim 29 wherein the height is a lower zone height.

34. The method of claim 15 wherein the feature caddie comprises a character proportion.

35. The method of claim 34 wherein the character proportion comprises an upper zone proportion.

36. The method of claim 34 wherein the character proportion comprises a lower zone proportion.

37. The method of claim 15 wherein the feature caddie comprises a breadth of a letter.

38. The method of claim 15 wherein the feature caddie comprises a distance between a first letter and a second letter.

39. The method of claim 15 wherein the feature caddie comprises a character slant.

40. The method of claim 15 wherein the feature caddie comprises a fluctuation of slant of a plurality of characters.

41. The method of claim 15 wherein the feature caddie comprises loop classification.

42. The method of claim 15 wherein the feature caddie comprises a curve concavity.

43. The method of claim 15 wherein the feature caddie is an ornamentation.

44. The method of claim 43 wherein the ornamentation comprises a simplification.

45. The method of claim 43 wherein the ornamentation comprises a distortion.

46. The method of claim 43 wherein the ornamentation comprises an ornamentation.

47. The method of claim 15 wherein the feature caddie comprises a contour point profile.

48. The method of claim 15 wherein the feature caddie comprises a tangent slope stroke component.

49. The method of claim 48 wherein the tangent slope stroke component comprises a horizontal stroke component.

50. The method of claim 48 wherein the tangent slope stroke component comprises a vertical stroke component.

51. The method of claim 48 wherein the tangent slope stroke component comprises a positive stroke component.

52. The method of claim 48 wherein the tangent slope stroke component comprises a negative stroke component.

53. The method of claim 15 wherein the feature caddie comprises a character tendency.

54. The method of claim 15 wherein the feature caddie comprises a character connection class.

55. The method of claim 15 wherein the feature caddie comprises a character connection consistency.

56. The method of claim 15 wherein the feature caddie comprises a baseline direction.

57. The method of claim 15 wherein the feature caddie comprises a baseline fluctuation.

58. The method of claim 15 wherein the feature caddie comprises an expected but missing punctuation.

59. The method of claim 15 wherein the feature caddie comprises a pressure pattern.

60. The method of claim 15 wherein the feature caddie comprises a pressure pattern.

61. The method of claim 15 wherein the feature caddie comprises a stroke sequence.

62. The method of claim 15 wherein the feature caddie comprises a border stability measurement.

63. The method of claim 15 wherein the feature caddie comprises a border symmetry.

64. The method of claim 15 wherein the feature caddie comprises degree of pressure.

65. The method of claim 15 wherein the feature caddie comprises a use of an abbreviation.

66. The method of claim 15 wherein the feature caddie comprises a use of a symbol.

67. The method of claim 15 wherein the feature caddie comprises retracings.

68. The method of claim 15 wherein the feature caddie comprises terminal conditions.

69. The method of claim 15 wherein the feature caddie comprises stroke type.

70. The method of claim 15 wherein the feature caddie comprises stroke artifacts.

71. The method of claim 15 wherein the feature caddie comprises loop attributes.

72. The method of claim 15 wherein the feature caddie comprises distance between words.

73. The method of claim 15 wherein the feature caddie comprises word proportions.

74. The method of claim 15 wherein the feature caddie comprises word foundation.

75. The method of claim 74 wherein the word foundation comprises a cusp.

76. The method of claim 74 wherein the word foundation comprises a garland.

77. The method of claim 74 wherein the word foundation comprises arcade.

78. The method of claim 74 wherein the word foundation comprises proportion.

79. The method of claim 15 wherein the feature caddie comprises rhythm.

80. The method of claim 15 wherein the feature caddie comprises consistency.

81. The method of claim 15 wherein the feature caddie comprises fine edge contours.

82. The method of claim 15 wherein the feature caddie comprises embedded isomorphisms.

83. The method of claim 1, wherein the vertex is a cross intersection of two lines.

84. The method of claim 1, wherein the vertex is a T-intersection of two lines.

85. The method of claim 1, wherein the vertex is a termination of a line.

86. The method of claim 1, wherein the edge is a line connecting a plurality of vertices.

* * * * *